United States Patent [19]

Hitz et al.

[11] Patent Number: 5,485,579
[45] Date of Patent: Jan. 16, 1996

[54] MULTIPLE FACILITY OPERATING SYSTEM ARCHITECTURE

[75] Inventors: David Hitz, Sunnyvale; Allan Schwartz, Saratoga; James Lau, Cupertino; Guy Harris, Mountain View, all of Calif.

[73] Assignee: Auspex Systems, Inc., Santa Clara, Calif.

[21] Appl. No.: 225,356

[22] Filed: Apr. 8, 1994

Related U.S. Application Data

[63] Continuation of Ser. No. 875,585, Apr. 28, 1992, abandoned, which is a continuation of Ser. No. 404,885, Sep. 8, 1989, abandoned.

[51] Int. Cl.[6] .......................... G06F 13/00; G06F 15/163
[52] U.S. Cl. .......................... 395/200.12; 395/200.02; 395/650; 395/700; 364/DIG. 1; 364/284; 364/284.3; 364/284.4; 364/280; 364/280.6; 364/280.9
[58] Field of Search .......................... 395/700, 650, 395/800, 200, 600, 425, 200.02, 200.12, 200.20, 200.07

[56] References Cited

U.S. PATENT DOCUMENTS

| | | | |
|---|---|---|---|
| 4,075,691 | 2/1978 | Davis et al. | 395/275 |
| 4,156,907 | 5/1979 | Rawlings et al. | 395/200 |
| 4,333,144 | 6/1982 | Whiteside et al. | 395/650 |
| 4,377,843 | 3/1983 | Garringer et al. | 395/275 |
| 4,399,503 | 8/1983 | Hawley | 395/325 |
| 4,456,957 | 6/1984 | Schieltz | 395/200 |
| 4,459,664 | 7/1984 | Pottier et al. | 395/325 |
| 4,488,231 | 12/1984 | Yu et al. | 395/425 |
| 4,494,188 | 1/1985 | Nakane et al. | 364/200 |
| 4,527,232 | 7/1985 | Bechtolsheim | 395/400 |
| 4,550,368 | 10/1985 | Bechtolsheim | 395/400 |
| 4,685,125 | 8/1987 | Zave | 379/96 |
| 4,710,868 | 12/1987 | Cocke et al. | 395/325 |
| 4,719,569 | 1/1988 | Ludemann et al. | 395/725 |
| 4,766,534 | 8/1988 | DeBenedictis | 395/200 |
| 4,780,821 | 10/1988 | Crossley | 395/650 |
| 4,783,730 | 11/1988 | Fischer | 395/275 |

(List continued on next page.)

FOREIGN PATENT DOCUMENTS

| | | |
|---|---|---|
| 0321723A2 | 6/1989 | European Pat. Off. . |
| 088165 | 10/1988 | Israel . |
| WO86/03607 | 6/1986 | WIPO . |
| WO89/03086 | 4/1989 | WIPO .......................... G06F 9/46 |

OTHER PUBLICATIONS

Svobodova, Liba, "File Servers for Network–Based Distributed Systems," *Computing Surveys*, vol. 16, No. 4, Dec. 1984, pp. 353–398.

Cheriton, David R., et al., "The Distributed V Kernel and its Performance for Diskless Workstations," Ninth Symposium on Operating System Principles, 1983, pp. 128–139.

(List continued on next page.)

*Primary Examiner*—Paul V. Kulik
*Attorney, Agent, or Firm*—Fliesler, Dubb, Meyer & Lovejoy

[57] ABSTRACT

This is achieved in a computer system employing a multiple facility operating system architecture. The computer system includes a plurality of processor units for implementing a predetermined set of peer-level facilities wherein each peer-level facility includes a plurality of related functions and a communications bus for interconnecting the processor units. Each of the processor units includes a central processor and the stored program that, upon execution, provides for the implementation of a predetermined peer-level facility of the predetermined set of peer-level facilities, and for performing a multi-tasking interface function. The multi-tasking interface function is responsive to control messages for selecting for execution functions of the predetermined peer-level facility and that is responsive to the predetermined peer-level facility for providing control messages to request or to respond to the performance of functions of another peer-level facility of the computer system. The multi-tasking interface functions of each of the plurality of processor units communicate among one another via the network bus.

19 Claims, 9 Drawing Sheets

U.S. PATENT DOCUMENTS

| | | | |
|---|---|---|---|
| 4,803,621 | 2/1989 | Kelly | 395/400 |
| 4,819,159 | 4/1989 | Shipley et al. | 395/475 |
| 4,825,354 | 4/1989 | Agrawal et al. | 364/200 |
| 4,845,609 | 7/1989 | Lighthart et al. | 395/275 |
| 4,887,204 | 12/1989 | Johnson et al. | 395/600 |
| 4,897,781 | 1/1990 | Chang et al. | 395/600 |
| 4,914,583 | 4/1990 | Weisshaar et al. | 364/200 |
| 5,001,628 | 3/1991 | Johnson et al. | 364/200 |
| 5,163,131 | 11/1992 | Row et al. | 395/200 |

OTHER PUBLICATIONS

Solomon, Marvin H. et al., "The Roscoe Distributed Operating System," Seventh ACM Symposium on Operating System Principles, 1979, pp. 108–114.

Birkhead, Evan, "Solutions Connect VMS To Host–Based TCP/IP And NFS", DEC Professional (Feb. 1989), vol. 6, Issue 14, p. 28.

Birkhead, Evan, "Topic's Connectivity Scheme", DEC Professional (May 1989), vol. 8, Issue 5, p. 28.

Breidenbach, Susan, "Novell joins supporters of Sun's NFS", Network World (FEb. 20, 1989), vol. 6, Issue 7, p. 5.

Breidenbach, Susan, "Start–up unveils accelerator for boosting speed of NFS", Network World (Jun. 12, 1989), vol. 6, Issue 23, pp. 19–20.

Carlson, et al., "HP AdvanceNet: A Growth–Oriented Computer Networking Architectural Strategy", Hewlett–Packard Journal (Oct. 1986), p. 2, pp. 6–10.

Eckerson, Wayne, "Sun, EDS Shaping Network File System for IBM's MVS", Network World (Sep. 19, 1988), vol. 5, Issue: 38, pp. 2,59.

Frank, Werner L., "Share a Common Storage Device Via File Servers", PC Week (Mar. 20, 1984), p. 19.

IEEE Computer, "I/O sybsystem", Sep. 1988, pp. 23–25 and 106.

Jenkins, Avery, "Choosing the Elements of Your Network", PC Week (Mar. 13, 1984), pp. 28–29, 35.

Keefe, Patricia, "Sun fills out IBM connectivity line", Computerworld (Sep. 19, 1988), p. 16.

Kramer, Matt, "MS–NET Debut Does Not Deter LAN Vendors", PC Week (Nov. 20, 1984), p. 11.

Motorola, Inc., Microsystems Products Technical Data Sheet (1986), microMAP1–7, "MicroMAP Manufacturing Automation Protocol Software".

Musich, Paula, "MVS Version of Sun NFS Software Announced", PC Week (Connectivity section) (Sep. 19, 1988), vol. 22, Issue 38 p. C/3.

Musich, Paula, "CMC Tailors OpenWare for DEC and Unix Environments", PC Week (Connectivity section) (Aug. 28, 1989), vol. 6, Issue 34, p. 53.

Osadzinski, Alex, "The Network File System (NFS)", 8202 Computer Standards & Interfaces, 8 (1988/89) No. 1, pp. 45–58, Amsterdam, The Netherlands.

Row, John, "LAN Software Links Diverse Machines, OS's", Mini–Micro Systems (Sep. 1985), pp. 141–142, 145, 147.

Row, et al., "Operating System Extensions Link Disparate Systems", Computer Design (Jul. 1984).

Sandberg, Russel, "The Sun Network Filesystem: Design, Implementation and Experience", Proceedings of the 1986 European Unix User's Conference (Apr. 1986).

Schnatmeier, Vanessa, "Epoch Delivers Mass Magnetic/ Optical Storage for Workstations", UnixWorld (Dec. 1988), p. 134.

Siegel, Alex, et al., "Deceit: A Flexible Distributed File System", National Aeronautics and Space Administration, Report No.: NAS 1.26:186412; TR–89–1042; NASA–CR–186412 (Dec. 7, 1989).

Smalley, Eric, "CMC Adds Support for NFS to VAX", Digital Review (Aug. 28, 1989), pp. 1,6.

Sorensen, Kristina, "Sun's NFS Circle Widens To Include MVS Mainframes", Digital Review (Sep. 26, 1988), pp. 1, 102.

Sullivan, Kristina B., "DEC Extends High End of VAX–Based File–Server Line", PC Week (Dec. 12, 1988), vol. 5, Issue 50, pp. C/4, C/8.

Sun Microsystems, Inc., "NFS: Network File System Protocol Specification, Request for Comments": 1094 (Mar. 1989).

Tan, S. M., et al., "SOS—Stan's Own Server, A NFS file server for the IBM PC", Department of Energy Report No. LBL–25770 (Aug. 1988).

Tanenbaum, Andrew S., "Computer Networks" (1988), 2nd Edition, Prentice Hall, pp. 35, 36, Chap. 9.

"TCP/IP Software", PC Week (Connectivity section) (Mar. 8, 1988), p. C/7.

Tribby, David M., "Network Services for HP Real–Time Computers", Hewlett–Packard Journal (Oct. 1986), pp. 22–27.

Vizard, Michael, "VAX TCP/IP Networking Option Will Support NFS Software That Runs on Sun", Digital Review (Nov. 23, 1987).

Vizard, Michael, "1988 Sees DEC Take a New Track: Won't Go It Alone", Digital Review (Dec. 19, 1988), vol. 5, Issue 24, pp. 8, 87.

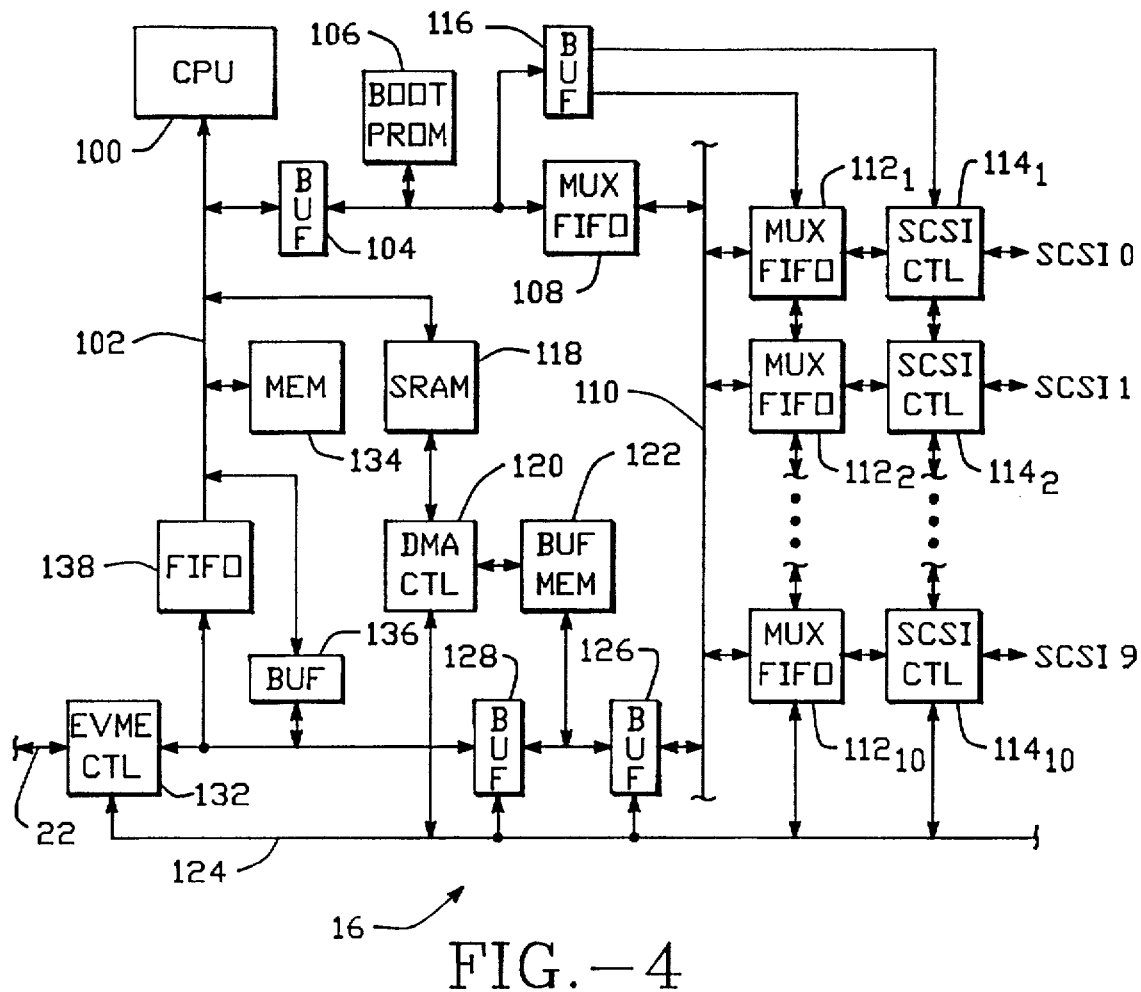
FIG.—4
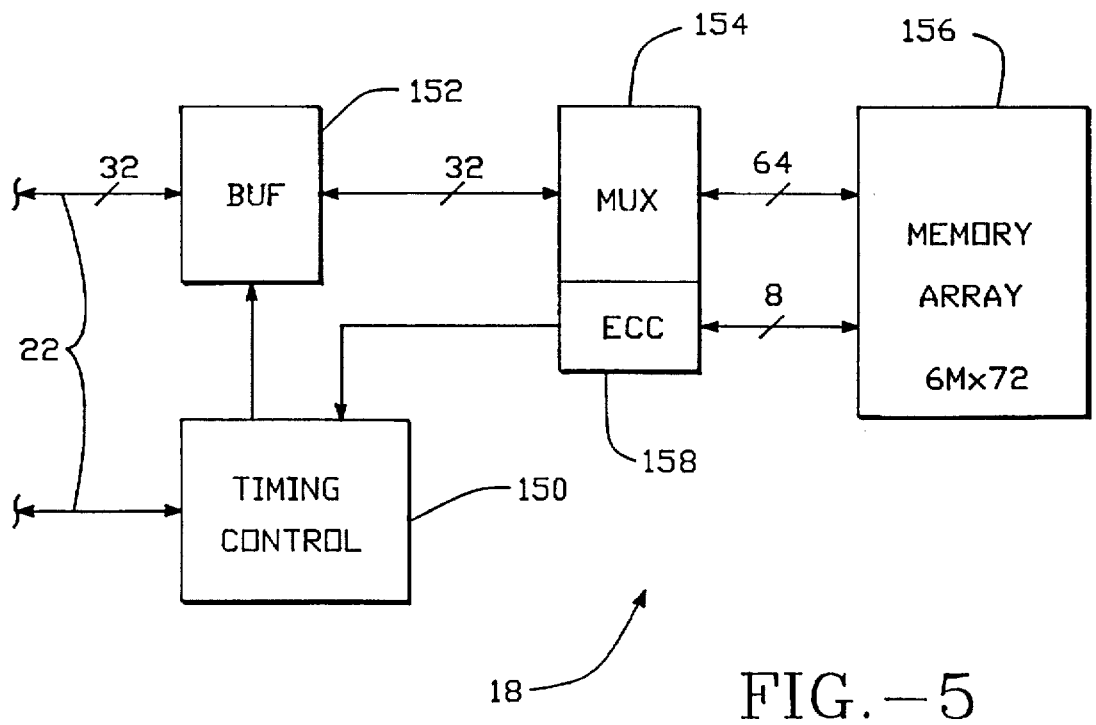
FIG.—5

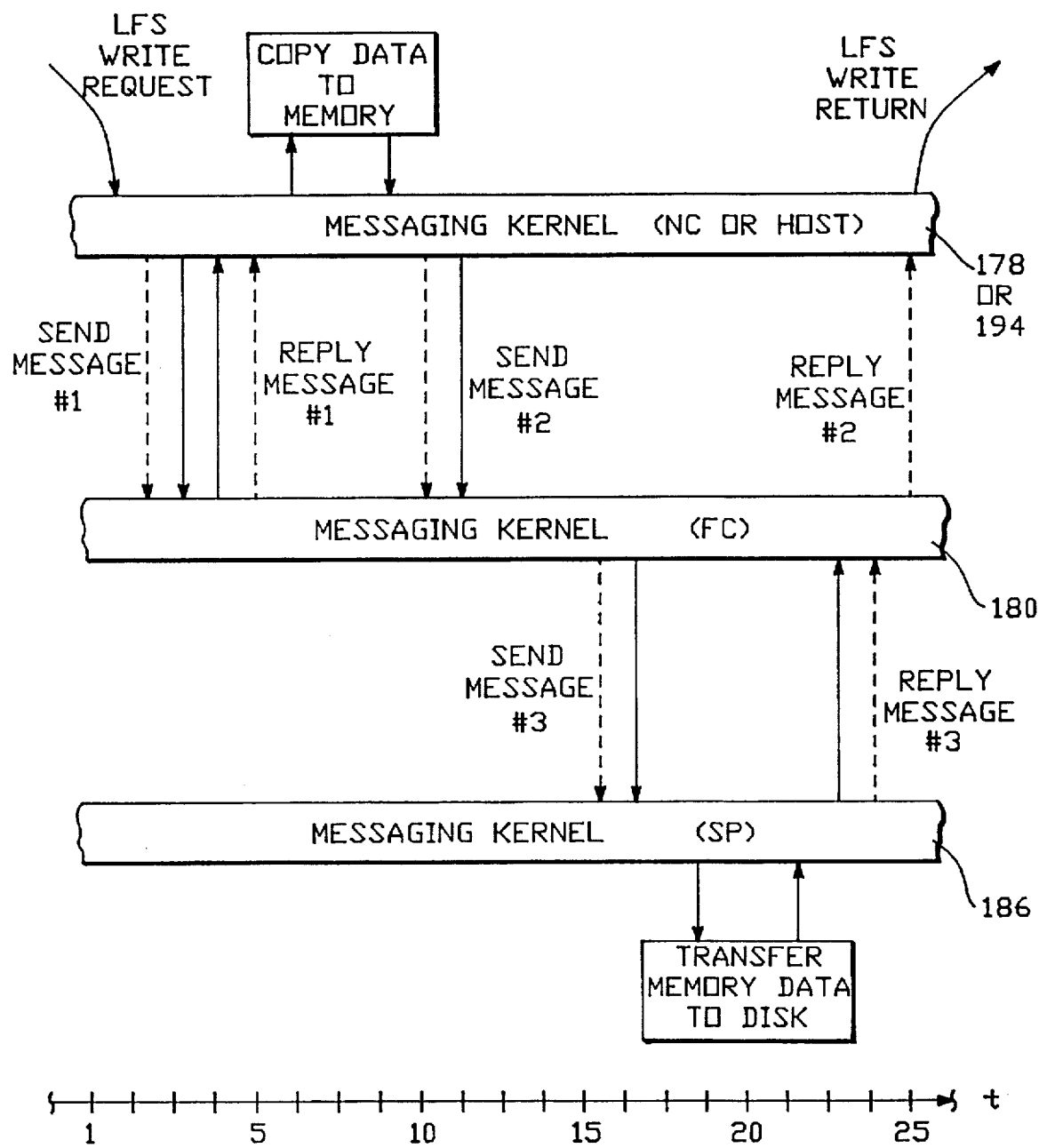
FIG.−13

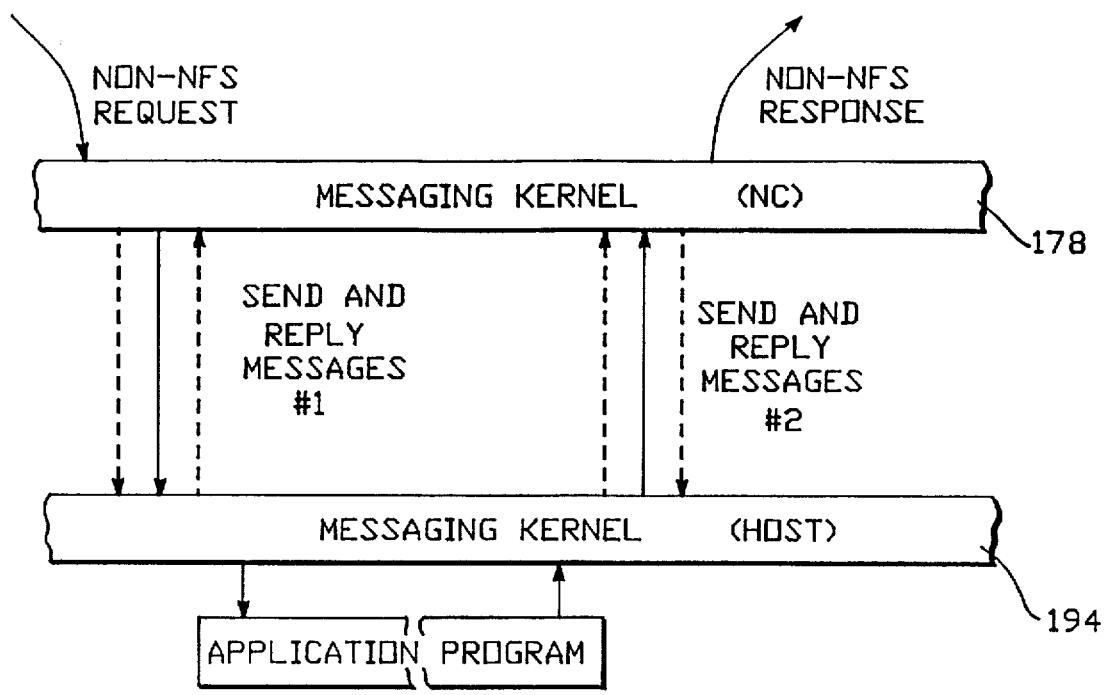
FIG.—14
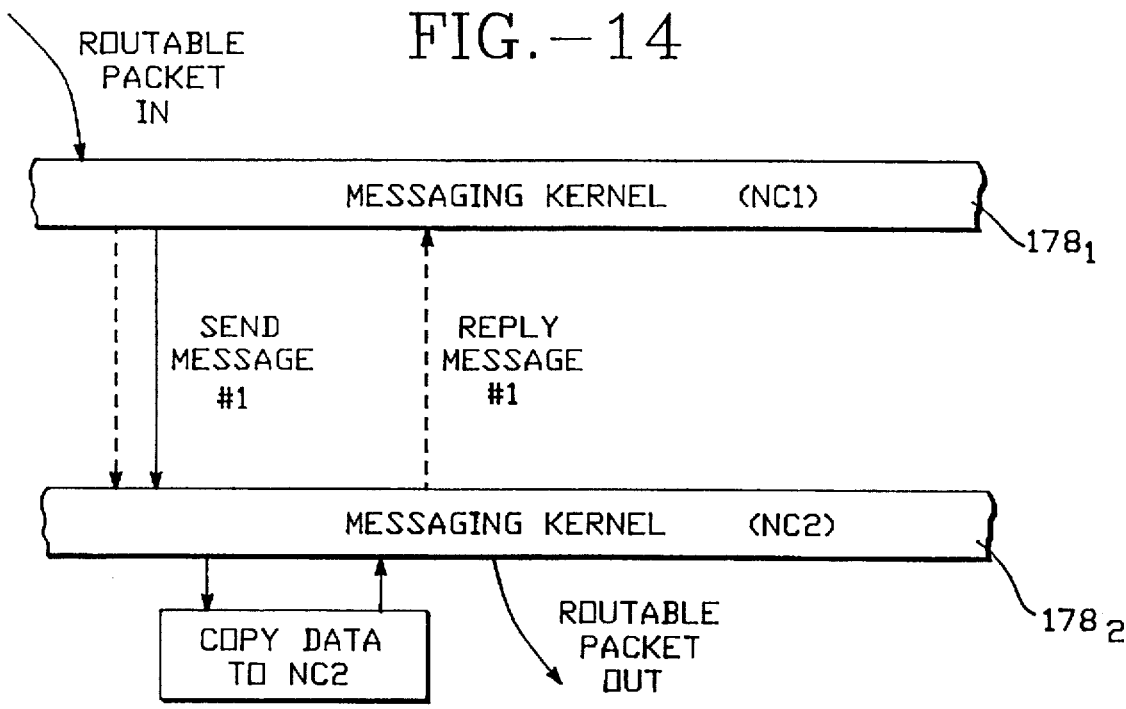
FIG.—15

MULTIPLE FACILITY OPERATING SYSTEM ARCHITECTURE

This application is a Continuation of Ser. No. 07/875,585, filed Apr. 28, 1992, now abandoned, which is a continuation of Ser. No. 07/404,885, filed Sep. 8, 1989, now abandoned.

CROSS-REFERENCE TO RELATED APPLICATIONS

The present application is related to the following U.S. patent applications:

1. PARALLEL I/O NETWORK FILE SERVER ARCHITECTURE, inventors: John Row, Larry Boucher, William Pitts, and Steve Blightman, U.S. Pat. No. 5,163,131, issued Nov. 10, 1992 and U.S. Pat. No. 5,355,453, issued Oct. 11, 1994;

2. ENHANCED VMEBUS PROTOCOL UTILIZING SYNCHRONOUS HANDSHAKING AND BLOCK MODE DATA TRANSFER, inventor: Daryl D. Starr, U.S. Pat. No. 5,388,231, issued Feb. 7, 1995;

3. HIGH SPEED, FLEXIBLE SOURCE/DESTINATION DATA BURST DIRECT MEMORY ACCESS CONTROLLER, invented by Daryl Starr, Stephen Blightman and Larry Boucher, U.S. Pat. No. 5,175,825, issued Dec. 29, 1992.

The above applications are all assigned to the assignee of the present invention and are all expressly incorporated herein by reference.

1. Field of the Invention

The present invention is generally related to operating system software architectures and, in particular, to a multi-processor operating system architecture based on multiple independent multi-tasking process kernels.

2. Background of the Invention

The desire to improve productivity, in circumstances involving computers, is often realized by an improvement in computing throughput. Conventional file servers are recognized as being a limiting factor in the potential productivity associated with their client workstations.

A file server is typically a conventional computer system coupled through a communications network, such as Ethernet, to client workstations and potentially other workstation file servers. The file server operates to provide a common resource base to its clients. The primary resource is typically the central storage and management of data files, but additional services including single point execution of certain types of programs, electronic mail delivery and gateway connection to other file servers and services are generally also provided.

The client workstations may utilize any of a number of communication network protocols to interact with the file server. Perhaps the most commonly known, if not most widely used, protocol suite is TCP/IP. This protocol suite and its supporting utility programs, provide for the creation of logical communication channels between multiple client workstations and a file server. These communication channels are generally optimized for point-to-point file transfers, i.e., multi-user file access control or activity administration is not provided. In addition, the supporting utility programs for these protocols impose a significant degree of user interaction in order to initiate file transfers as well as the entire responsibility to manage the files once transferred.

Recently, a number of network connected remote file system mechanisms has been developed to provide clients with a single consistent view of a file system of data files, even though portions of the file system may be physically distributed between a client's own local storage, one or more file servers or even other client workstations. These network file system mechanisms operate to hide the distinction between local data files and data files in the remotely distributed portions of the file system accessible only through the network. The advantages of such file system mechanisms include retention of multi-user access controls over the data files physically present on the server, to the extent intrinsically provided by a server, and a substantial simplification of a client workstation's view and productive utilization of the file system.

Two implementations of a network file system mechanism are known as the network file system (NFS), available from Sun Microsystems, Inc., and the remote file sharing (RFS) system available from American Telephone and Telegraph, Inc.

The immediate consequence of network file system mechanism is that they have served to substantially increase the throughput requirements of the file server itself, as well as that of the communications network. Thus, the number of client workstations that can be served by a single file server must be balanced against the reduction in productivity resulting from increased file access response time and the potentially broader effects of a degradation in communication efficiency due to the network operating at or above its service maximum.

An increase in the number of client workstations is conventionally handled by the addition of another file server, duplicating or possibly partitioning the file system between the file servers, and providing a dedicated high bandwidth network connection between the file servers. Thus, another consequence of the limited throughput of conventional file servers is a greater cost and configuration complexity of the file server base in relation to the number of client workstations that can be effectively serviced.

Another complicating factor, for many technical and practical reasons, is a requirement that the file server be capable of executing the same or a similar operating system as the attached client workstations. The reasons include the need to execute maintenance and monitoring programs on the file server, and to execute programs, such as database servers, that would excessively load the communications network if executed remotely from the required file data. Another often overlooked consideration is the need to avoid the cost of supporting an operating system that is unique to the file server.

Given these considerations, the file server is typically only a conventional general purpose computer with an extended data storage capacity and communications network interface that is little different from that present on each of the client workstations. Indeed, many file servers are no more than physically repackaged workstations. Unfortunately, even with multiple communications network interfaces, such workstation-based computers are either incapable or inappropriate, from a cost/performance viewpoint, to perform as a single file server to a large group of client workstations.

The throughput offered by conventional general purpose computers, considered in terms of their sustained file system facility data transfer bandwidth potential, is limited by a number of factors, though primarily due to the general purpose nature of their design. Computer system design is necessarily dependent on the level and nature of the operating system to be executed, the nature of the application load to be executed, and the degree of homogeneity of applications. For example, a computer system utilized solely for scientific computations may forego an operating system entirely, may be restricted to a single user at a time, and employ specialized computation hardware optimized for the anticipated highly homogeneous applications. Conversely, where an operating system is required, the system design typically calls for the utilization of dedicated peripheral controllers, operated under the control of a single processor executing the operating system, in an effort to reduce the peripheral control processing overhead of the system's single primary processor. Such is the design of most conventional file servers.

A recurring theme in the design of general purpose computer systems is to increase the number of active primary processors. In the simplest analysis, a linear improvement in the throughput performance of the computer system might be expected. However, utilization of increasing numbers of primary processors is typically thwarted by the greater growth of control overhead and contention for common peripheral resources. Indeed, the net improvement in throughput is often seen to increase slightly before declining rapidly as the number of processors is increased.

SUMMARY OF THE INVENTION

Therefore, a general purpose of the present invention is to provide an operating system architecture for the control of a multi-processor system to provide an efficient, expandable computer system for servicing network file system requests.

This is achieved in a computer system employing a multiple facility operating system architecture. The computer system includes a plurality of processor units for implementing a predetermined set of peer-level facilities, wherein each peer-level facility implements a plurality of related functions, and a communications bus for interconnecting the processor units. Each of the processor units includes a central processor and a stored program that, upon execution, provides for the implementation of a predetermined peer-level facility and for implementing a multi-tasking interface function. The multi-tasking interface function is responsive to control messages for selecting for execution functions of the predetermined peer-level facility. The multi-tasking interface function is also responsive to the predetermined peer-level facility for providing control messages to request or to respond to the performance of functions of another peer-level facility of the computer system. The multi-tasking interface functions of each of the plurality of processor units communicate among one another via the network bus.

Thus, in a preferred embodiment of the present invention, the set of peer-level facilities includes network communications, file system control, storage control and a local host operating system.

An advantage of the present invention is that it provides for the implementation of multiple facilities, each instance on a respective processor, all within a single cohesive operating system while incurring little additional control overhead in order to maintain operational coherency.

Another advantage of the present invention is that direct peer to peer-level facility communication is supported in order to minimize overhead in processing network file system requests.

A further advantage of the present invention is that it realizes a computer system software architecture that is readily expandable to include multiple instances of each peer-level facility, and respective peer-level processors, in a single cohesive operating system environment including direct peer to peer-level facility communications between like facilities.

Yet another advantage of the present invention is that it may include an operating system as a facility operating concurrently and without conflict with the otherwise independent peer to peer-level facility communications of the other peer-level facilities. The operating system peer-level facility may itself be a conventional operating system suitably compatible with the workstation operating systems so as to maintain compatibility with "standard" file server operating systems. The operating system peer-level facility may be used to handle exception conditions from the other peer-level facilities including handling of non-network file system requests. Consequently, the multiple facility operating system architecture of the present invention appears to client workstations as a conventional, single processor file server.

A still further advantage of the present invention is that it provides a message-based operating system architecture framework for the support of multiple, specialized peer-level facilities within a single cohesive computer operating system; a capability particularly adaptable for implementation of a high-performance, high-throughput file server.

BRIEF DESCRIPTION OF THE DRAWINGS

These and other attendant advantages and features of the present invention will become apparent and readily appreciated as the same becomes better understood by reference to the following detailed description when considered in conjunction with the accompanying drawings, in which like reference numerals indicate like parts throughout the figures thereof, and wherein:

FIG. 4 is a block diagram of a storage processor suitable for implementing a storage peer-level facility in accordance with a preferred embodiment of the present invention;

FIG. 5 is simplified block diagram of a primary memory array suitable for use as a shared memory store in a preferred embodiment of the present invention;

FIG. 13 is an illustration of a data flow for an LFS write request through the peer-level facilities of a preferred embodiment of the present invention;

FIG. 14 illustrates the data flow of a non-LFS data packet between the network communication and local host peer-level facilities in accordance with a preferred embodiment of the present invention; and FIG. 15 illustrates the data flow of a data packet routed between two network communications peer-level facilities in accordance with a preferred embodiment of the present invention.

DETAILED DESCRIPTION OF THE INVENTION

While the present invention is broadly applicable to a wide variety of hardware architectures, and its software architecture may be represented and implemented in a variety of specific manners, the present invention may be best understood from an understanding of its preferred embodiment.

I. System Architecture Overview

A. Hardware Architecture Overview

Figure 1:
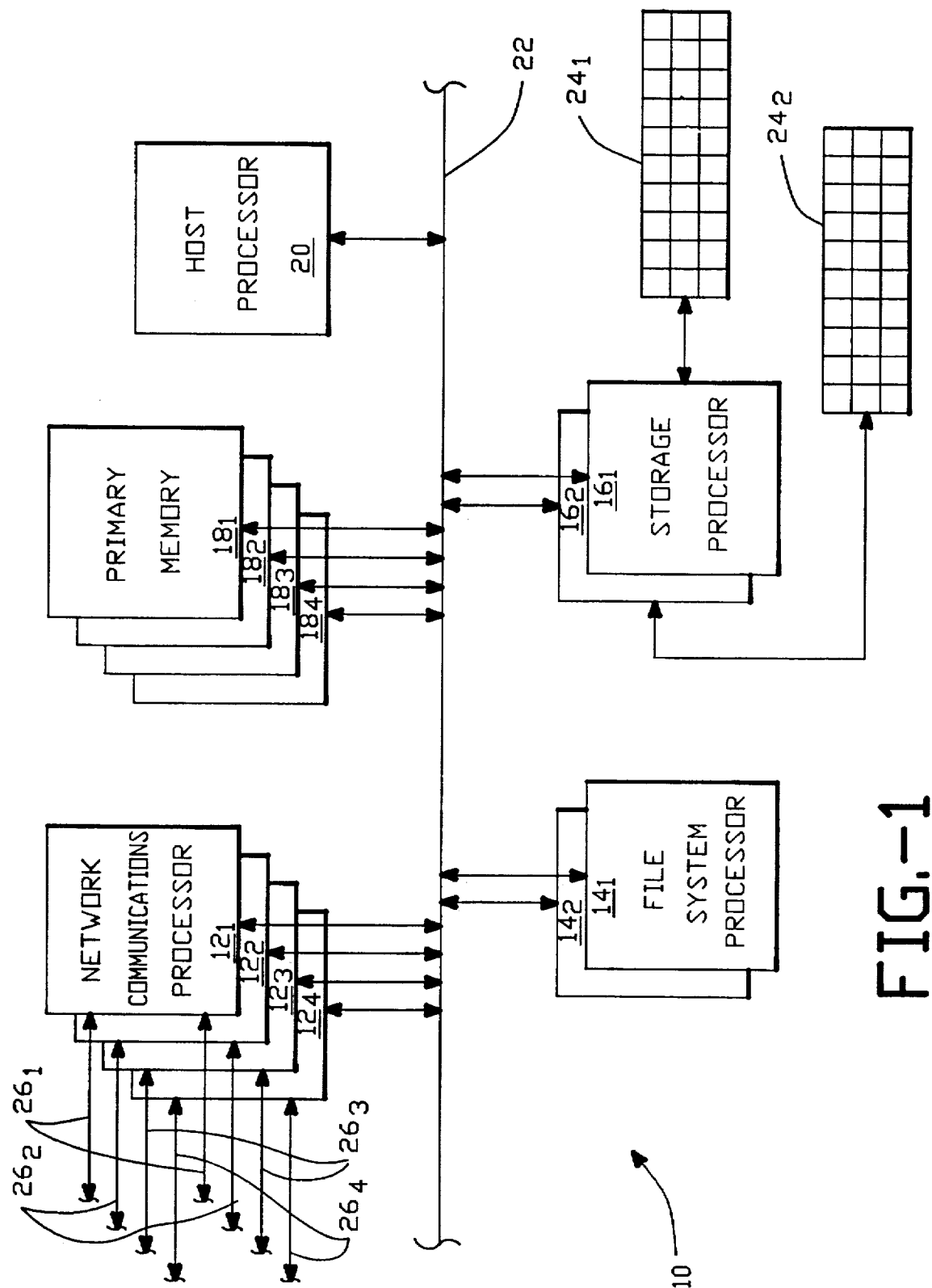
FIG. 1 is a simplified block diagram of a preferred computer system architecture for implementing the multiple facility operating system architecture of the present invention.

A block diagram representing the preferred embodiment of the hardware support for the present invention, generally indicated by the reference numeral 10, is provided in FIG. 1. The architecture of the preferred hardware system 10 is described in the above-identified related application entitled PARALLEL I/O NETWORK FILE SERVER ARCHITECTURE; which application is expressly incorporated herein by reference.

The hardware components of the system 10 include multiple instances of network controllers 12, file system controllers 14, and mass storage processors, 16, interconnected by a high-bandwidth backplane bus 22. Each of these controllers 12, 14, 16 preferably includes a high performance processor and local program store, thereby minimizing their need to access the bus 22. Rather, bus 22 accesses by the controllers 12, 14, 16 are substantially limited to transfer accesses as required to transfer control information and client workstation data between the controllers 12, 14, 16 system memory 18, and a local host processor 20, when necessary.

The illustrated preferred system 10 configuration includes four network controllers $12_{1-4}$, two file controllers $14_{1-2}$, two mass storage processors $16_{1-2}$, a bank of four system memory cards $18_{1-4}$, and a host processor 20 coupled to the backplane bus 22. The invention, however, is not limited to this number and type of processors. Rather, six or more network communications processors 12 and two or more host processors 20 could be implemented within the scope of the present invention.

Each network communications processor (NP) $12_{1-4}$ preferably includes a Motorola 68020 processor for supporting two independent Ethernet network connections, shown as the network pairs $26_1$–$26_4$. Each of the network connections directly support the ten megabit per second data rate specified for a conventional individual Ethernet network connection. The preferred hardware embodiment of the present invention thus realizes a combined maximum data throughput potential of 80 megabits per second.

The file system processors (FP) $14_{1-2}$, intended to operate primarily as a specialized compute engines, each include a high-performance Motorola 68020 based microprocessor, four megabytes of local data store and a smaller quarter-megabyte of high-speed program memory store.

The storage processors (SP) $16_{1-2}$ function as intelligent small computer system interface (SCSI) controllers. Each includes a Motorola 68020 microprocessor, a local program and data memory, and an array of ten parallel SCSI channels. Drive arrays $24_{1-2}$ are coupled to the storage processors $16_{1-2}$ to provide mass storage. Preferably, the drive arrays $24_{1-2}$ are ten unit-wide arrays of SCSI storage devices uniformly from one to three units deep. The preferred embodiment of the present invention uses conventional 768 megabyte 5 ¼ inch hard disk drives for each unit of the arrays $24_{1-2}$. Thus, each drive array level achieves a storage capacity of approximately 6 gigabytes, with each storage processor readily supporting a total of 18 gigabytes. Consequently, a system 10 is capable of realizing a total combined data storage capacity of 36 gigabytes.

The local host processor 20, in the preferred embodiments of the present invention, is a Sun central processor card, model Sun 3E120, manufactured and distributed by Sun Microsystems, Inc.

Finally, the system memory cards 18 each provide 48 megabytes of 32-bit memory for shared use within the computer system 10. The memory is logically visible to each of the processors of the system 10.

A VME bus 22 is used in the preferred embodiments of the present invention to interconnect the network communication processors 12, file system processors 14, storage processors 16, primary memory 18, and host processor 20. The hardware control logic for controlling the VME bus 22, at least as implemented on the network communication processor 12 and storage processor 16, implements a bus master fast transfer protocol in addition to the conventional VME transfer protocols. The system memory 18 correspondingly implements a modified slave VME bus control logic to allow the system memory 18 to also act as the fast data transfer data source or destination for the network communication processors 12 and storage processors 16. The fast transfer protocol is described in the above-identified related application entitled "ENHANCED VMEBUS PROTOCOL UTILIZING SYNCHRONOUS HANDSHAKING AND BLOCK MODE DATA TRANSFER" now U.S. Pat. No. 5,388,231; which application is expressly incorporated herein by reference.

It should be understood that, while the system 10 configuration represents the initially preferred maximum hardware configuration, the present invention is not limited to the preferred number or type of controllers, the preferred size and type of disk drives or use of the preferred fast data transfer VME protocol.

B. Software Architecture Overview

Although applicable to a wide variety of primary, or full function, operating systems such as MVS and VMS, the preferred embodiment of the present invention is premised on the Unix operating system as distributed under license by American Telephone and Telegraph, Inc. and specifically the SunOS version of the Unix operating system, as available from Sun Microsystems, Inc. The architecture of the Unix operating system has been the subject of substantial academic study and many published works including "The Design of the Unix Operating System", Maurice J. Bach, Prentice Hall, Inc., 1986.

In brief, the Unix operating system is organized around a non-preemptive, multi-tasking, multi-user kernel that implements a simple file-oriented conceptual model of a file system. Central to the model is a virtual file system (VFS) interface that operates to provide a uniform file oriented, multiple file system environment for both local and remote files.

Connected to the virtual file system is the Unix file system (UFS). The UFS allows physical devices, pseudo-devices and other logical devices to appear and be treated, from a client's perspective, as simple files within the file system model. The UFS interfaces to the VFS to receive and respond to file oriented requests such as to obtain the attributes of a file, the stored parameters of a physical or logical device, and, of course, to read and write data. In carrying out these functions, the UFS interacts with a low level software device driver that is directly responsible for an attached physical mass storage device. The UFS handles all operations necessary to resolve logical file oriented operations, as passed from the VFS, down to the level of a logical disk sector read or write request.

The VFS, in order to integrate access to remote files into the file system model, provides a connection point for network communications through the network file system mechanism, if available. The preferred network file system mechanism, NFS, is itself premised on the existence of a series of communication protocol layers that, inclusive of NFS and within the context of the present invention, can be referred to as an NFS stack. These layers, in addition to an NFS "layer," typically include a series of protocol handling layers generally consistent with the International Standards Organization's Open Systems Interconnection (ISO/OSI) model. The OSI model has been the subject of many publications, both regarding the conceptual aspects of the model as well as specific implementations, including "Computer Networks, 2nd Edition" Andrew S. Tanenbaum, Prentice Hall, 1988.

In summary, the OSI layers utilized by the present invention include all seven layers described in the OSI reference model: application, presentation, session, transport, network, data link and physical layers. These layers are summarized below, in terms of their general purpose, function and implementation for purposes of the present invention.

The application layer protocol, NFS, provides a set of remote procedure call definitions, for use in both server and client oriented contexts, to provide network file services. As such, the NFS layer provides a link between the VFS of the Unix kernel and the presentation protocol layer.

The presentation layer protocol, provided as an external data representation (XDR) layer, defines a common description and encoding of data as necessary to allow transfer of data between different computer architectures. The XDR is thus responsible for syntax and semantic translation between the data representations of heterogeneous computer systems.

The session layer protocol, implemented as a remote procedure call (RPC) layer, provides a remote procedure call capability between a client process and a server process. In a conventional file server, the NFS layer connects through the XDR layer to the RPC layer in a server context to support the file oriented data transfers and related requests of a network client.

The transport layer protocol, typically implemented as either a user datagram protocol (UDP) or transmission control protocol (TCP) layer, provides for a simple connectionless datagram delivery service. NFS uses UDP.

The network layer protocol, implemented as an internet protocol (IP) layer, performs internet routing, based on address mappings stored in an IP routing database, and data packet fragmentation and reassembly.

The data link (DL) layer manages the transfer and receipt of data packets based on packet frame information. Often this layer is referred to as a device driver, since it contains the low level software control interface to the specific communications hardware, including program control of low level data transmission error correction/handling and data flow control. As such, it presents a hardware independent interface to the IP layer.

Finally, the physical layer, an Ethernet controller, provides a hardware interface to the network physical transmission medium.

The conventional NFS stack, as implemented for the uniprocessor VAX architecture, is available in source code form under license from Sun Microsystems, Inc.

The preferred embodiment of the present invention utilizes the conventional SunOS Unix kernel, the Sun/VAX reference release of the UFS, and the Sun/VAX reference release of the NFS stack as its operating system platform. The present invention establishes an instantiation of the NFS stack as an independent, i.e., separately executed, software entity separate from the Unix kernel. Instantiations of the UFS and the mass storage device driver are also established as respective independent software entities, again separate from the Unix kernel. These entities, or peer-level facilities, are each provided with an interface that supports direct communication between one another. This interface, or messaging kernel layer, includes a message passing, multi-tasking kernel. The messaging kernel layers are tailored to each type of peer-level facility in order to support the specific facility's functions. The provision for multi-tasking operation allows the peer-level facilities to manage multiple concurrent processes. Messages are directed to other peer-level facilities based upon the nature of the function requested. Thus, for NFS file system requests, request messages may be passed from an NFS network communications peer-level facility directly to a UFS file system peer-level facility and, as necessary, then to the mass storage peer-level facility. The relevant data path is between the NFS network communications peer-level facility and the mass storage peer-level facility by way of the VME shared address space primary memory. Consequently, the number of peer-level facilities is not logically bounded and servicing of the most common type of client workstation file system needs is satisfied while requiring only a minimum amount of processing.

Finally, a Unix kernel, including its own NFS stack, UFS, and mass storage device driver, is effectively established as a another peer-level facility. As with the other peer-level facilities, this operating system facility is provided with a multi-tasking interface for interacting concurrently with the other peer-level facilities as just another entity within the system 10. While the operating system kernel peer-level facility is not involved in the immediate servicing of most NFS requests, it interacts with the NFS stack peer-level facility to perform general management of the ARP and IP data bases, the initial NFS file system access requests from a client workstation, and to handle any non-NFS type requests that might be received by the NFS stack peer-level facility.

II. Peer-level Processors

A. Network Control Processor

Figure 2:
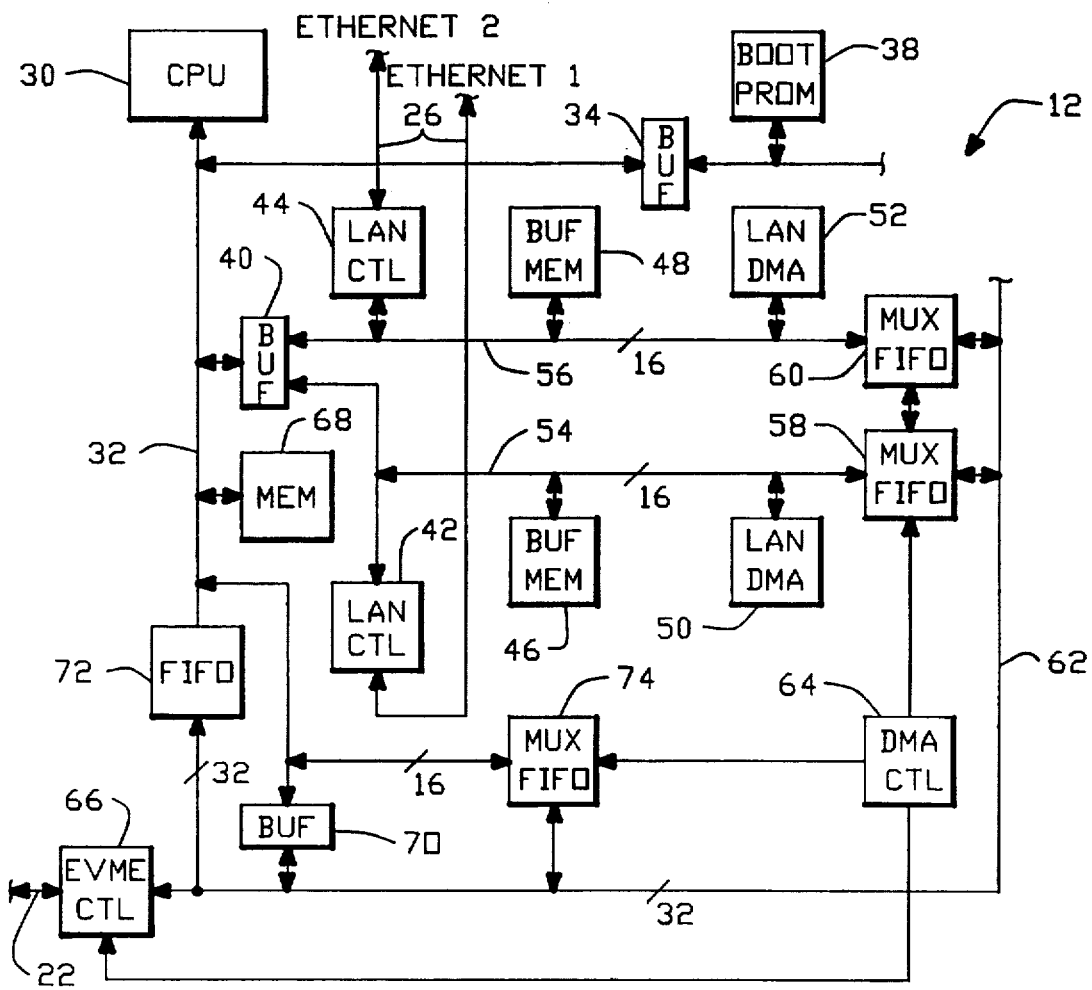
FIG. 2 is a block diagram of a network communications processor suitable for implementing a network communications peer-level facility in accordance with a preferred embodiment of the present invention.

A block diagram of the preferred network control processor is shown in FIG. 2. The network controller 12 includes a 32-bit central processing unit (CPU) 30 coupled to a local CPU bus 32 that includes address, control and data lines. The CPU is preferably a Motorola 68020 processor. The data line portion of the CPU bus 32 is 32 bits wide. All of the elements coupled to the local bus 32 of the network controller 12 are memory mapped from the perspective of the CPU 30. This is enabled by a buffer 34 that connects the local bus 32 to a boot PROM 38. The boot PROM 38 is utilized to store a boot program and its necessary start-up and operating parameters. Another buffer 40 allows the CPU 30 to separately address a pair of Ethernet local area network (LAN) controllers 42, 44, their local data packet memories 46, 48, and their associated packet direct memory access (DMA) controllers 50, 52, via two parallel address, control, and 16-bit wide data buses 54, 56. The LAN controllers 42, 44 are programmed by the CPU 30 to utilize their respective local buffer memories 46, 48 for the storage and retrieval of data packets as transferred via the Ethernet connections 26. The DMA controllers 50, 52 are programmed by the CPU 30 to transfer data packets between the buffer memories 46, 48 and a respective pair of multiplexing FIFOs 58, 60 also connected to the LAN buses 54, 56. The multiplexing FIFOs 58, 60 each include a 16-bit to 32-bit wide data multiplexer/demultiplexer, coupled to the data portion of the LAN buses 54, 56, and a pair of internal FIFO buffers. Thus, for example in the preferred embodiment of the present invention, a first 32-bit wide internal FIFO is coupled through the multiplexer to the 16-bit wide LAN bus 54. The second internal FIFO, also 32-bit wide, is coupled to a secondary data bus 62. These internal FIFO buffers of the multiplexing FIFO 58, as well as those of the multiplexing FIFO 60, may be swapped between their logical connections to the LAN buses 54, 56 and the secondary data bus 62. Thus, a large difference in the data transfer rate of the LAN buses 54, 60 and the secondary data bus 62 can be maintained for a burst data length equal to the depth of the internal FIFOs 58, 60.

A high speed DMA controller 64, controlled by the CPU 30, is provided to direct the operation of the multiplexing FIFOs 58, 60 as well as an enhanced VME control logic block 66, through which the data provided on the secondary data bus 62 is communicated to the data lines of the VME bus 22. The purpose of the multiplexing FIFOs 58, 60, besides acting as a 16-bit to 32-bit multiplexer and buffer, is to ultimately support the data transfer rate of the fast transfer mode of the enhanced VME control logic block 66.

Also connected to the local CPU data bus 32 is a quarter megabyte block of local shared memory 68, a buffer 70, and a third multiplexing FIFO 74. The memory 68 is shared in the sense that it also appears within the memory address space of the enhanced VME bus 22 by way of the enhanced VME control logic block 66 and buffer 70. The buffer 70 preferably provides a bidirectional data path for transferring data between the secondary data bus 62 and the local CPU bus 32 and also includes a status register array for receiving and storing status words either from the CPU 30 or from the enhanced VME bus 22. The multiplexing FIFO 74, identical to the multiplexing FIFOs 58, 60, provides a higher speed, block-oriented data transfer capability for the CPU 30.

Finally, a message descriptor FIFO 72 is connected between the secondary data-bus 62 and the local CPU bus 32. Preferably, the message descriptor FIFO 72 is addressed from the enhanced VME bus 22 as a single shared memory location for the receipt of message descriptors. Preferably the message descriptor FIFO 72 is a 32-bit wide, single buffer FIFO with a 256-word storage capability. In accordance with the preferred embodiments of the present invention, the message descriptor FIFO is described in detail in the above-referenced related application Ser. No. 07/474, 350, "BUS LOCKING FIFO MULTI-PROCESSOR COMMUNICATIONS SYSTEM", now abandoned; which application is hereby incorporated by reference. However, for purposes of completeness, an enhancement embodied in the enhanced VME control logic block 66 is that it preemptively allows writes to the message descriptor FIFO 72 from the enhanced VME bus 22 unless the FIFO 72 is full. Where a write to the message descriptor FIFO 72 cannot be accepted, the enhanced VME control logic block 66 immediately declines the write by issuing a VME bus error signal onto the enhanced VME bus.

B. File System Control Processor

Figure 3:
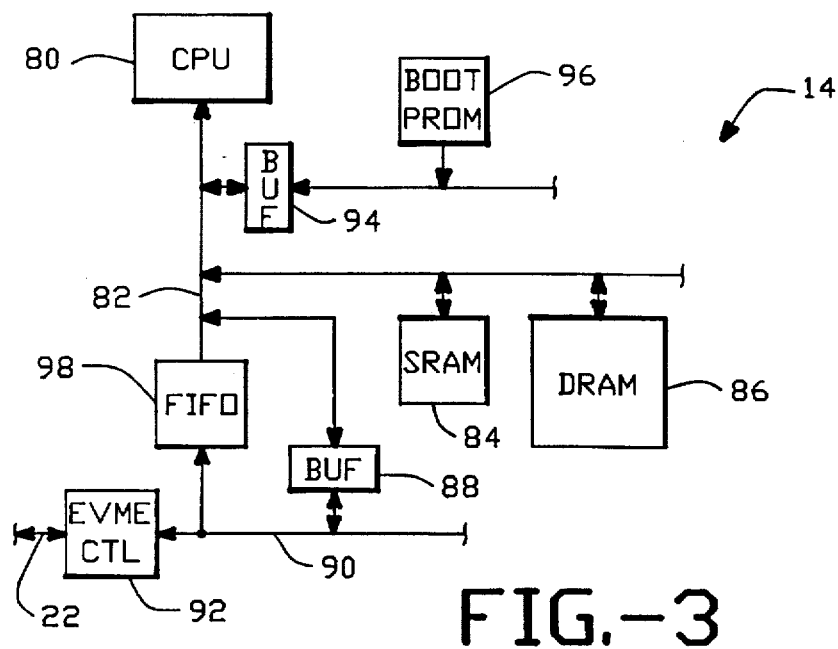
FIG. 3 is a block diagram of a file system processor suitable for implementing a file system controller peer-level facility in accordance with a preferred embodiment of the present invention.

The preferred architecture of a file system processor 14 60 is shown in FIG. 3. A CPU 80, preferably a Motorola 68020 processor, is connected via a local CPU address, control and 32-bit wide data bus 82 to the various elements of the file controller 14. These principle elements include a 256 kilobyte static RAM block 84, used for storing the file system control program, and a four megabyte dynamic RAM block 86 for storing local data, both connected directly to the local CPU bus 82. A buffer 88 couples the local CPU bus 82 to a secondary 32-bit wide data bus 90 that is, in turn, coupled through an enhanced VME control and logic block 92 to the data bus lines of the VME bus 22. In addition to providing status register array storage, the buffer 88 allows the memory blocks 84, 86 to be accessible as local shared memory on the VME bus 22. A second buffer 94 is provided to logically position a boot PROM 96, containing the file controller initialization program, within the memory address map of the CPU 80. Finally, a single buffer message descriptor FIFO 98 is provided between the secondary data bus 90 and the local CPU bus 82. The message descriptor FIFO 98 is again provided to allow preemptive writes to the file controller 14 from the enhanced VME bus 22.

C. Storage Control Processor

A block diagram of a storage processor 16 is provided in FIG. 4. A CPU 100, preferably a Motorola 68020 processor, is coupled through a local CPU address, control and 32-bit wide data bus 102 and a buffer 104 to obtain access to a boot PROM 106 and a double-buffered multiplexing FIFO 108 that is, in turn, connected to an internal peripheral data bus 110. The internal peripheral data bus 110 is, in turn, coupled through a parallel channel array of double-buffered multiplexing FIFOs $112_{1-10}$ and SCSI channel controllers $114_{1-10}$. The SCSI controllers $114_{1-10}$ support the respective SCSI buses (SCSI0–SCSI9) that connect to a drive array 24.

Control over the operation of the double buffer FIFO $112_{1-10}$ and SCSI controller $114_{1-10}$ arrays is ultimately by the CPU 100 via a memory-mapped buffer 116 and a first port of a dual ported SRAM command block 118. The second port of the SRAM block 118 is coupled to a DMA controller 120 that controls the low level transfer of data between the double-buffered FIFOs 108, $112_{1-10}$, a temporary store buffer memory 122 and the enhanced VME bus 22. In accordance with a preferred embodiment of the present invention, the DMA controller responds to commands posted by the CPU 100 in the dual-ported SRAM block 118 to select any of the double-buffered FIFOs 108, $112_{1-10}$, the buffer memory 122, and the enhanced VME bus 22 as a source or destination of a data block transfer. To accomplish this, the DMA controller 120 is coupled through a control bus 124 to the double buffered FIFOs 108, $112_{1-10}$, the SCSI controllers $114_{1-10}$, the buffer memory 122, a pair of secondary data bus buffers 126, 128, and an enhanced VME control and logic block 132. The buffers 126, 128 are used to route data by selectively coupling the internal peripheral data bus 110 to a secondary data bus 130 and the buffer memory 122. The DMA controller 120, as implemented in accordance with a preferred embodiment of the present invention, is described in detail in the above-referenced related application "HIGH SPEED, FLEXIBLE SOURCE/DESTINATION DATA BURST DIRECT MEMORY ACCESS CONTROLLER", now U.S. Pat. No. 5,175,825; which application is hereby incorporated by reference. Finally, a one megabyte local shared memory block 134, a high speed buffer and register array 136, and a preemptive write message descriptor FIFO 138 are provided connected directly to the local CPU data bus 102. The buffer 136 is also coupled to the secondary data bus 130, while the message descriptor FIFO 138 is coupled to the secondary data bus 130.

D. Primary Memory Array

FIG. 5 provides a simplified block diagram of the preferred architecture of a memory card 18. Each memory card 18 operates as a slave on the enhanced VME bus and therefore requires no on-board CPU. Rather, a timing control block 150 is sufficient to provide the necessary slave control operations. In particular, the timing control block 150, in response to control signals from the control portion of the enhanced VME bus 22, enables a 32-bit wide buffer 152 for an appropriate direction transfer of 32-bit data between the enhanced VME bus 22 and a multiplexer unit 154. The multiplexer 154 provides a multiplexing and demultiplexing function, depending on data transfer direction, for a six megabit by seventy-two bit word memory array 156. An error correction code (ECC) generation and testing unit 158 is coupled to the multiplexer 154 to generate or verify, again depending on transfer direction, eight bits of ECC data per memory array word. The status of each ECC verification operation is provided back to the timing control block 150.

E. Host Processor

The host processor 20, as shown in FIG. 1, is a conventional Sun 3E120 processor. Due to the conventional design of this product, a software emulation of a message descriptor FIFO is performed in a reserved portion of the local host processor's shared memory space. This software message descriptor FIFO is intended to provide the functionality of the message descriptor FIFOs 72, 98, and 138. A preferred embodiment of the present invention includes a local host processor 20', not shown, that includes a hardware preemptive write message descriptor FIFO, but that is otherwise functionally equivalent to the processor 20.

III. Peer-level Facility Architecture

A. Peer-Level Facility Functions

Figure 6:
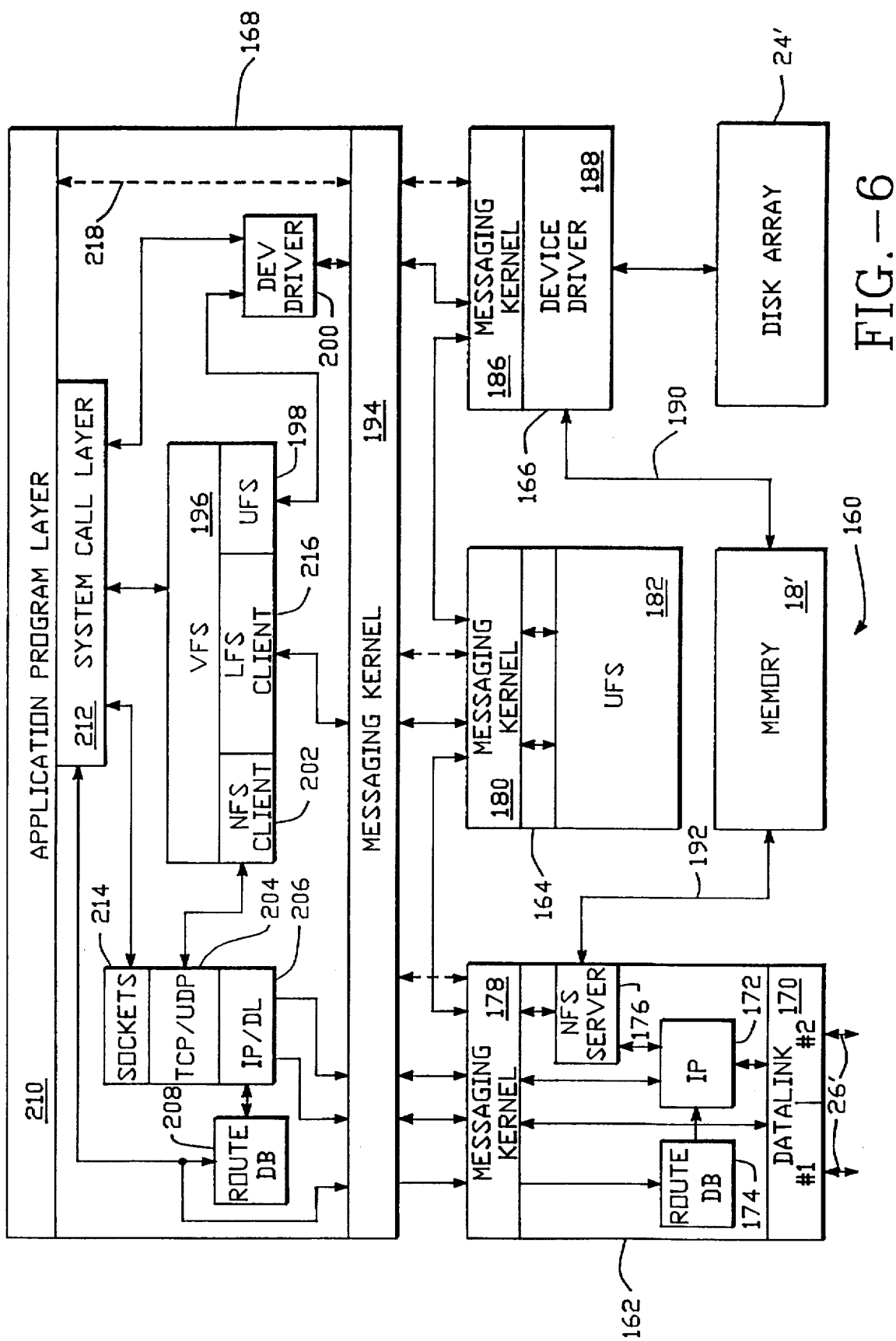
FIG. 6 is a block diagram of the multiple facility operating system architecture configured in accordance with a preferred embodiment of the present invention.

FIG. 6 provides an illustration of the multiple peer-level facility architecture of the present invention. However, only single instantiations of the preferred set of the peer-level facilities are shown for purposes of clarity.

The peer-level facilities include the network communications facility (NC) 162, file system facility (FS) 164, storage facility (S) 166 and host facility (H) 168. For completeness, the memory 18 is illustrated as a logical resource 18' and, similarly, the disk array 24 as a resource 24'.

The network communications facility 162 includes a messaging kernel layer 178 and an NFS stack. The messaging kernel layer 178 includes a multi-tasking kernel that supports multiple processes. Logically concurrent executions of the code making up the NFS stack are supported by reference to the process context in which execution by the peer-level processor is performed. Each process is uniquely identified by a process ID (PID). Context execution switches by the peer-level processor are controlled by a process scheduler embedded in the facility's multi-tasking kernel. A process may be "active"—at a minimum, where process execution by the peer-level processor continues until a resource or condition required for continued execution is unavailable. A process is "blocked" when waiting for notice of availability of such resource or condition. For the network communications facility 162, within the general context of the present invention, the primary source of process blocking is in the network and lower layers where a NC process will wait, executing briefly upon receipt of each of a series of packet frames, until sufficient packet frames are received to be assembled into a complete datagram transferrable to a higher level layer. At the opposite extreme, a NC process will block upon requesting a file system or local host function to be performed, i.e., any function controlled or implemented by another peer-level facility.

The messaging kernel layer 178, like all of the messaging kernel layers of the present invention, allocates processes to handle respective communication transactions. In allocating a process, the messaging kernel layer 178 transfers a previously blocked process, from a queue of such processes, to a queue of active processes scheduled for execution by the multi-tasking kernel. At the conclusion of a communication transaction, a process is deallocated by returning the process to the queue of blocked processes.

As a new communication transaction is initiated, an address or process ID of an allocated process becomes the distinguishing datum by which the subsequent transactions are correlated to the relevant, i.e., proper handling, process. For example, where a client workstation initiates a new communication transaction, it provides its Ethernet address. The network communication facility, will store and subsequently, in responding to the request, utilize the client's Ethernet address to direct the response back to the specific requesting client.

The NC facility similarly provides a unique facility ID and the PID of its relevant process to another peer-level facility as part of any request necessary to complete a client's request. Thus, an NC facility process may block .with certainty that the responding peer-level facility can direct its response back to the relevant process of the network communications peer-level facility.

The network and lower level layers of the NFS stack necessary to support the logical Ethernet connections 26' are generally illustrated together as an IP layer 172 and data link layer 170. The IP layer 172, coupled to the IP route database 174, is used to initially distinguish between NFS and non-NFS client requests. NFS requests are communicated to an NFS server 176 that includes the remaining layers of the NFS stack. The NFS server 176, in turn, communicates NFS requests to the network communications messaging kernel layer 178. By the nature of the call, the messaging kernel layer 178 is able to discern between NFS request calls, non-NFS calls from the IP layer 172 and network calls received directly from the network layers 170.

For the specific instance of NFS requests, making up the large majority of requests handled by the network communications facility 162, the relevant NC process calls the messaging kernel layer 178 to issue a corresponding message to the messaging kernel layer 180 of the file system facility 164. The relevant NC process is blocked pending a reply message and, possibly, a data transfer. That is, when the messaging kernel layer 178 receives the NFS request call, a specific inter-facility message is prepared and passed to the messaging kernel layer 180 with sufficient information to identify the request and the facility that sourced the request. As illustrated, messages are exchanged between the various messaging kernel layers of the system 160. However, the messages are in fact transferred physically via the enhanced VME bus connecting the peer-level processors upon which the specific peer-level facilities are executing. The physical to logical relationship of peer-level facilities to peer-level processors is established upon the initialization of the system 160 by providing each of the messaging kernel layers with the relevant message descriptor FIFO addresses of the peer-level processors.

In response to a message received, the messaging kernel layer 180 allocates a FS process within its multi-tasking environment to handle the communication transaction. This active FS process is used to call, carrying with it the received message contents, a local file system (LFS) server 182. This LFS server 182 is, in essence, an unmodified instantiation 184 of the UFS. Calls, in turn, issued by this UFS 182, ultimately intended for a device driver of a mass storage device, are directed back to the messaging kernel layer 180. The messaging kernel layer distinguishes such device driver related functions being requested by the nature of the function call. The messaging kernel layer 180 blocks the relevant FS process while another inter-processor message is prepared and passed to a messaging kernel layer 186 of the storage facility 166.

Since the storage facility 166 is also required to track many requests at any one time, a single manager process is used to receive messages. For throughput efficiency, this S manager process responds to FIFO interrupts, indicating that a corresponding message descriptor has just been written to the SP FIFO, and immediately initiates the SP processor operation necessary to respond to the request. Thus, the currently preferred S facility handles messages at interrupt time and not in the context of separately allocated processes. However, the messaging kernel layer 186 could alternately allocate an S worker process to service each received message request.

The message provided from the file system facility 164 includes the necessary information to specify the particular function required of the storage facility in order to satisfy the request. Within the context of the allocated active S process, the messaging kernel layer 186 calls the request corresponding function of a device driver 188.

Depending on the availability and nature of the resource requested, the device driver 188 will, for example, direct the requested data to be retrieved from the disk array resource 24'. As data is returned via the device driver layer 188, the relevant S process of the messaging kernel layer 186 directs the transfer of the data into the memory resource 18'.

In accordance with the preferred embodiments of the present invention, the substantial bulk of the memory resource 18' is managed as an exclusive resource of the file system facility 164. Thus, for messages requesting the transfer of data to or from the disk array 24', the file system facility 164 provides an appropriate shared memory address referencing a suitably allocated portion of the memory resource 18'. Thus, as data is retrieved from the disk array 24', the relevant S process of the messaging kernel layer 186 will direct the transfer of data from the device driver layer 188 to the message designated location within the memory resource 18', as illustrated by the data path 190.

Once the data transfer is complete, the relevant S process "returns" to the messaging kernel layer 186 and a reply message is prepared and issued by the messaging kernel layer 186 to the messaging kernel layer 180. The relevant S process may then be deallocated by the messaging kernel layer 186.

In response to this reply message, the messaging kernel layer 180 unblocks its relevant FS process, i.e., the process that requested the S facility data transfer. This, in turn, results in the relevant FS process executing the UFS 182 and eventually issuing a return to the messaging kernel layer 180 indicating that the requested function has been completed. In response, the messaging kernel layer 180 prepares and issues a reply message on behalf of the relevant FS process to the messaging kernel layer 178; this message will include the shared memory address of the requested data as stored within the memory resource 18'.

The messaging kernel layer 178 responds to the reply message from the file system facility 164 by unblocking the relevant NC process. Within that NC process's context, the messaging kernel layer 178 performs a return to the NFS server 176 with the shared memory address. The messaging kernel layer 178 transfers the data from the memory resource 18' via the indicated data path 192 to local stored memory for use by the NFS server layer 176. The data may then be processed through the NFS server layer 176, IP layer 172 and the network and lower layers 170 into packets for provision onto the network 26' and directed to the originally requesting client workstation.

Similarly, where data is received via the network layer 170 as part of an NFS write transfer, the data is buffered and processed through the NFS server layer 176. When complete, a call by the NFS server 176 to the messaging kernel layer 178 results in the first message of an inter-facility communication transaction being issued to the file system facility 164. The messaging kernel layer 180, on assigning a FS process to handle the request message, replies to the relevant NC process of the messaging kernel layer 178 with an inter-facility message containing a shared memory address within the memory resource 18'. The NFS data is then transferred from local shared memory via the data path 192 by the messaging kernel 178. When this data transfer is complete, another inter-facility message is passed to the relevant FS process of the messaging kernel layer 180. That process is then unblocked and processes the data transfer request through the LFS/UFS 182. The UFS 182, in turn, initiates, as needed, inter-facility communication transactions through the messaging kernel layer 180 to prepare for and ultimately transfer the data from the memory resource 18' via the data path 190 and device driver 188 to the disk array resource 24'.

The host operating system facility 168 is a substantially complete implementation of the SunOS operating system including a TCP/IP and NFS stack. A messaging kernel layer 194, not unlike the messaging kernel layers 178, 180, 186 is provided to logically integrate the host facility 186 into the system 160. The operating system kernel portion of the facility 168 includes the VFS 196 and interfaces with a standard instantiation of the UFS 198. The UFS 198 is, in turn, coupled to a mass storage device driver 200 that, in normal operation, provides for the support of UFS 198 requests by calling the messaging kernel layer 194 to issue inter-facility messages to the storage facility 166. Thus, the storage facility 166 does not functionally differentiate between the local host facility 168 and the file system facility 164 except during the initial phase of bootup. Rather, both generally appear as unique but otherwise undifferentiated logical clients of the storage facility 166.

Also interfaced to the VFS 196 is a conventional client instantiation of an NFS layer 202. That is, the NFS layer 202 is oriented as a client for processing client requests directed to another file server connected through a network communications facility. These requests are handled via a TCP/UDP layer 204 of a largely conventional instantiation of the Sun NFS client stack. Connected to the layer 204 are the IP and data link layers 206. The IP and data link layers 206 are modified to communicate directly with the messaging kernel layer 194. Messages from the messaging kernel layer 194, initiated in response to calls directly from the data link layer 206 are logically directed by the messaging kernel 178 directly to the data link layer 170 of a network communications facility. Similarly, calls from the IP layer 172, recognized as not NFS requests of a local file system, are passed through the messaging kernel layers 178 and 194 directly to the TCP/UDP layers 204. In accordance with the preferred embodiments of the present invention, the responses by the host facility 168 in such circumstances are processed back through the entire host TCP/IP stack 214, 204, 206, the messaging kernel layers 194, 178, and finally the data link layer 170 of an NC facility 162.

Ancillary to the IP and data link layers 206, a route database 208 is maintained under the control and direction of a conventional "routed" daemon application. This, and related daemons such as the "mountd" execute in the application program layer as background processes. In order to maintain coherency between the route database 208 and the route database 174 present in the network communications facility 162, a system call layer 212, provided as the interface between the application program layer and the kernel functions of the host facility 168, is modified in accordance with the present invention. The modification provides for the issuance of a message containing any update information directed to the route database 208, from the daemons, to be provided by an inter-facility communication transaction from the messaging kernel layer 194 to the messaging kernel layer 178. Upon receipt of such a message, the messaging kernel layer 178 directs an appropriate update to the route database 174.

The system call layer 212 also provides for access to the TCP/UDP layers via a conventional interface layer 214 known as sockets. Low level application programs may use the system call layer 212 to directly access the data storage system by calling directly on the device driver 200. The system call layer also interfaces with the VFS 196 for access to or by the NFS client 202 and the UFS 198.

In addition, as provided by the preferred embodiments of the present invention, the VFS 196 also interfaces to a local file system (LFS) client layer 216. The conventional VFS 196 implements a "mount" model for handling the logical relation between and access to multiple file systems. By this model a file system is mounted with respect to a specific file system layer that interfaces with the VFS 196. The file system is assigned a file system ID (FSID). File operations subsequently requested of the VFS 196 with regard to a FSID identified file system will be directed to the appropriate file system.

In accordance with the present invention, the LFS client layer 216 is utilized in the logical mounting of file systems mounted through the file system facility 164. That is, the host facility's file oriented requests presented to the VFS 196 are routed, based on their FSID, through the LFS client layer 216 to the messaging kernel layer 194, and, in turn, to the messaging kernel layer 180 of the file system facility 164 for servicing by the UFS 182. The model is extended for handling network file system requests. A client workstation may then issue a mount request for a file system previously exported through the VFS 196. The mount request is forwarded by a network communications facility 162 ultimately to a mounted daemon running in the application layer 210 of the host facility 194. The mounted daemon response in turn provides the client with the FSID of the file system if the export is successful. Thereafter, the client's NFS file system requests received by the network communications facility 162 will be redirected, based on the FSID provided with the request, to the appropriate file system facility 164 that has mounted the requested file system.

Consequently, once a file system is mounted by the UFS 182 and exported via the network communications and host facilities 162, 168, file oriented NFS requests for that file system need not be passed to or processed by the host facility 168. Rather, such NFS requests are expediently routed directly to the appropriate file system facility 164.

The primary benefits of the present invention should now be apparent. In addition to allowing multiple, independent instantiations of the network communication, file system, storage and host facilities 162, 164, 166, 168, the immediate requirements for all NFS requests may be serviced without involving the substantial performance overhead of the VFS 196 and higher level portions of the conventional Unix operating system kernel.

Finally, another aspect of the host facility 168 is the provision for direct access to the messaging kernel layer 194 or via the system call layer 212 as appropriate, by maintenance application programs when executed within the application program layer 210. These maintenance programs may be utilized to collect performance data from status accumulation data structures maintained by the messaging kernel layer 194 and, by utilizing corresponding inter-facility messages, the accumulated status information from status data structures in the messaging kernel layers 178, 180 and 186.

B. Messaging Kernel Layer Functions

The messaging kernel layers 178, 180, 186 and 194 each include a small, efficient multi-tasking kernel. As such, each provides only fundamental operating system kernel services. These services include simple lightweight process scheduling, message passing and memory allocation. A library of standard functions and processes provide services such as sleep(), wakeup(), error logging, and real time clocks in a manner substantially similar to those functions of a conventional Unix kernel.

The list below summarizes the primary function primitives of the multi-tasking kernel provided in each of the messaging kernel layers 178, 180, 186 and 194.

| | |
|---|---|
| k_register(name) | Registers the current process as a provider of a named service. |
| k_resolve(name) | Returns the process ID for a named service. |
| k_send(msg,pid) | Sends a message to a specified process and blocks until the message is returned. |
| k_reply(msg) | Returns a received messages to its sender. |
| k_null_reply(msg) | Returns an unmodified message to the sender. (Faster than k_reply(msg) because the message need not be copied back.) |
| k_receive() | Blocks until a message is sent to this process. |

The balance of the messaging kernel layers 178, 180, 186 and 194 is made up of routines that presumptively implement, at least from the perspective of the balance of the facility, the functions that a given facility might request of another. These routines are premised on the function primitives provided by the multi-tasking kernel to provide the specific interface functions necessary to support the NFS stack, UFS, storage device driver, or host operating system. Since such routines do not actually perform the functions for which they are called, they may be referred to as "stub routines".

C. Inter-Facility Communication (IFC) System

Communication of information between the peer-level facilities is performed as a series of communication transactions. A transaction, defined as a request message and a reply message, occurs between a pair of messaging kernel layers, though others may "listen" in order to gather performance data or perform diagnostics. A single transaction may be suspended, i.e., the reply message held, while the receiving messaging kernel layer initiates a separate communication transaction with another peer-level facility. Once the reply message of the second transaction is received, a properly reply to the initial communication transaction can then be made.

1. Message Descriptors and Messages

The transfer of a message between sending and receiving messaging kernel layers is, in turn, generally a two step process. The first step is for the sending messaging kernel layer to write a message descriptor to the receiving messaging kernel layer. This is accomplished by the message descriptor being written to the descriptor FIFO of the receiving peer-level processor.

The second step is for the message, as identified by the message descriptor, to be copied, either actually or implicitly, from the sending messaging kernel layer to the receiving messaging kernel layer. This copy, when actually performed, is a memory to memory copy from the shared memory space of the sending peer-level processor to that of the receiving peer-level processor. Depending on the nature of the communication transaction, the message copy will be actually performed by the sending or receiving peer-level processor, or implicitly by reference to the image of the original message kept by the messaging kernel layer that initiated a particular communication transaction.

Figure 7:
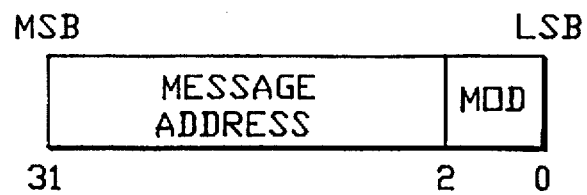
FIG. 7 is a representation of a message descriptor passed between peer-level facilities to identify the location of a message.

The message identified by a message descriptor is evaluated by the receiving messaging kernel layer to determine what is to be done with the message. A message descriptor as used by a preferred embodiment of the present invention is shown in FIG. 7. The message descriptor is, in essence, a single 32-bit word partitioned into two fields. The least significant field is used to store a descriptor modifier, while the high order 30-bit field provides a shared memory address to a message to which the descriptor modifier pertains. The preferred values of the modifier field are given in Table 1.

TABLE 1

Message Modifiers

| Modifier | Meaning |
|---|---|
| 0 | Pointer to a message being sent |
| 1 | Pointer to a reply message |
| 2 | Pointer to message to be forwarded |
| 3 | Pointer to message acknowledging a forwarded message |

For request messages that are being sent, the receiving messaging kernel layer performs the message copy. For a message that is a reply to a prior message, the sending messaging kernel layer is effectively told whether a message copy must be performed. That is, where the contents of a message have not been changed by the receiving messaging kernel layer, an implicit copy may be performed by replying with a messaging descriptor that points to the original message image within the sending messaging kernel layer's local shared memory space. Similarly for forwarding type communication transactions the receiving messaging kernel layer performs the copy. A message forwarding transaction is completed when an acknowledgement message is provided. The purpose of the acknowledgement is to notify the sending messaging kernel layer to know that it can return the reference message buffer to its free buffer pool.

Figure 8:
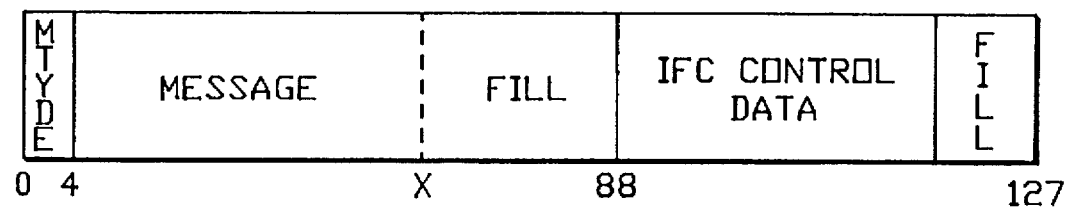
FIG. 8 is a representation of a peer-level facility message as used in a preferred embodiment of the present invention.

The preferred block format of a message is illustrated in FIG. 8. The message is a single data structure defined to occupy 128 bytes. The initial 32-bit word of the message encodes the message type and a unique peer-level facility identifier. The text of the message then follows with any necessary fill to reach a current maximum text limit. In the preferred embodiment of the present invention, the text length is 84 bytes. An inter-facility communication (IFC) control data block is provided, again followed by any necessary fill characters needed to complete the 128-byte long message. This IFC control data preferably includes a copy of the address of the original message, the relevant sending and receiving (destination) process identifiers associated with the current message, and any queue links required to manage the structure while in memory.

An exemplary message structure is provided in Table 2.

TABLE 2

Exemplary Message Structure

```
typedef struct m16_msg {
    K_MSGTYPE type;              /* request code */
    char       msg[84];
    vme_t      addr;             /* shared memory address of
                                    the original message */
    PID        m16_sender_pid;   /* PID of last sender. */
    PID        m16_forward_pid;  /* PID of last forwarder. */
    PID        m16_dest_pid;     /* PID of dest. process. */
    /*         Following value is LOCAL and need
               not be transferred. */
    struct m16_msg *m16_link;    /* message queue
                                    link */
} K_MSG;
```

This structure (K_MSG) includes the message type field (K_MSGTYPE), the message text (msg[]), and the IFC block (addr, m16_sender_pid, m16_sender_pid, m16_dest_pid, and m16_link). This K_MSG structure is used to encapsulate specific messages, such as exemplified by a file system facility message structure (FS_STD_T) shown in Table 3.

TABLE 3

Exemplary Specific Message Structure

```
typedef struct {
    K_MSGTYPE  type;
    long       errno;
    FC_CRED    cred;    /* Access credentials */
    FC_FH      file;    /* File handle */
    union {
        FS_FSID  fsid;  /* For fc_get_server. */
        long     mode;  /* {READ,WRITE,EXEC} for
                           fc_access. */
        K_PID    pid;   /* FS facility server pid */
        long     mask;  /* Mask attributes. */
    } un;
} FS_STD_T;
```

The FS_STD$_{13}$ T structure is overlaid onto a K_MSG structure with byte zero of both structures aligned. This composite message structure is created as part of the formatting of a message prior to being sent. Other message structures, appropriate for particular message circumstances, may be used. However, all are consistent with the use of the K_MSG message and block format described above.

2. IFC Message Generation

Figure 9:
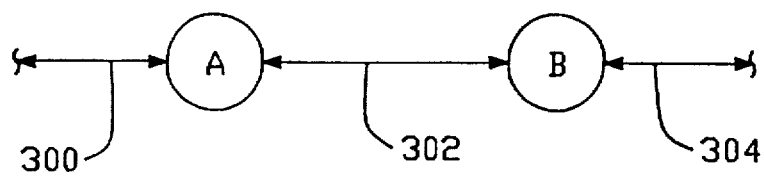
FIG. 9 is a simplified representation of a conventional program function call.

The determination to send a message, and the nature of the message, is determined by the peer-level facilities. In particular, when a process executing on a peer-level processor requires the support of another peer-level facility, such as to store or retrieve data or to handle some condition that it alone cannot service, the peer-level facility issues a message requesting the required function or support. This message, in accordance with the present invention, is generally initiated in response to the same function call that the facility would make in a uniprocessor configuration of the prior art. That is, in a conventional single processor software system, execution of a desired function may be achieved by calling an appropriate routine, that, in turn, determines and calls its own service routines. This is illustrated in FIG. 9. A function call to a routine A, illustrated by the arrow 300, may select and call 302 a routine B. As may be necessary to carry out its function, the routine B may call 304 still further routines. Ultimately, any functions called by the routine B return to the function B which returns to the function A. The function A then itself returns with the requested function call having been completed.

Figure 10:
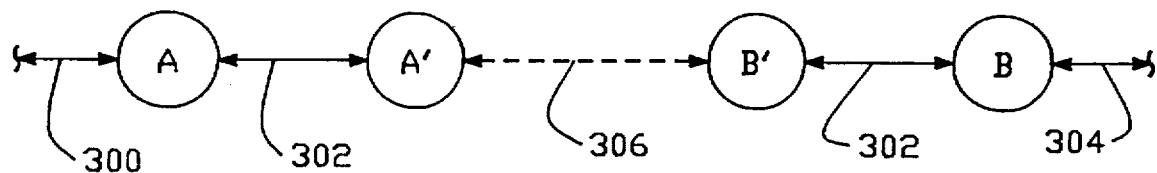
FIG. 10 is a simplified representation of an inter-facility function call in accordance with the preferred embodiment of the present invention.

In accordance with the present invention, the various messaging kernels layers have been provided to allow the independent peer-level facilities to be executed on respective processors. This is generally illustrated in FIG. 10 by the inclusion of the functions A' and B' representing the messaging kernel layers of two peer-level facilities. A function call 302 from the routine A is made to the messaging kernel A'. Although A' does not implement the specific function called, a stub routine is provided to allow the messaging kernel layer A' to implicitly identify function requested by the routine A and to receive any associated function call data; the data being needed by the routine B to actually carry out the requested function. The messaging kernel layer A' prepares a message containing the call data and sends a message descriptor 306 to the appropriate messaging kernel layer B'. Assuming that the message is initiating a new communication transaction, the messaging kernel layer B' copies the message to its own shared memory.

Based on the message type, the messaging kernel B' identifies the specific function routine B that needs to be called. Utilizing one of its own stub routines, a call containing the data transferred by the message is then made to the routine B. When routine B returns to the stub process from which it was called, the messaging kernel layer B' will prepare an appropriate reply message to the messaging kernel layer A'. The routine B return may reference data, such as the status of the returning function, that must also be transferred to the messaging kernel layer A'. This data is copied into the message before the message is copied back to the shared memory space of the A' peer-level processor. The message copy is made to the shared memory location where the original message was stored on the A' peer-level processor. Thus, the image of the original message is logically updated, yet without requiring interaction between the two messaging kernel layers to identify a destination storage location for the reply message. A "reply" message descriptor pointing to the message is then sent to the messaging kernel layer A'.

The messaging kernel layer A', upon successive evaluation of the message descriptor and the message type field of the message, is able to identify the particular process that resulted in the reply message now received. That is, the process ID as provided in the original message sent and now returned in the reply message, is read. The messaging kernel layer A' is therefore able to return with any applicable reply message data to the calling routine A in the relevant process context.

Figure 11:
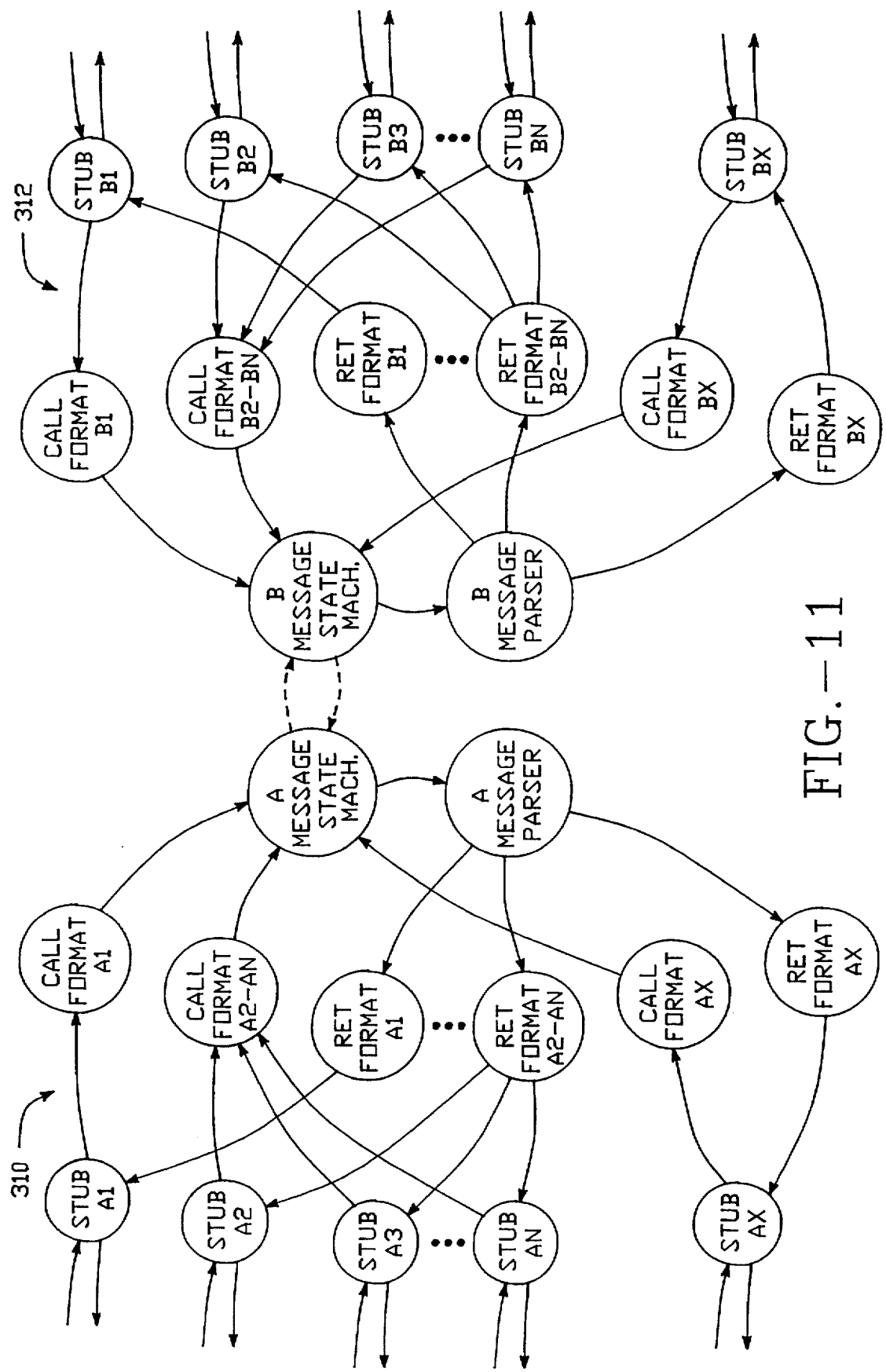
FIG. 11 is a control state diagram illustrating the interface functions of two peer-level facilities in accordance with a preferred embodiment of the present invention.

A more robust illustration of the relation between two messaging kernel layers is provided in FIG. 11. A first messaging kernel layer 310 may, for example, represent the messaging kernel layer 178 of the network communications peer-level facility 162. In such case, the series of stub routines A1-X include a complete NFS stack interface as well as an interface to every other function of the network communications facility that either can directly call or be called by the messaging kernel layer 178. Consequently, each call to the messaging kernel layer is uniquely identifiable, both in type of function requested as well as the context of the process that makes the call. Where the messaging kernel layer calls a function implemented by the NFS stack of its network communications facility, a process is allocated to allow the call to operate in a unique context. Thus, the call to or by a stub routine is identifiable by the process ID, PID, of the calling or responding process, respectively.

The calling process to any of the stub routines A1-X, upon making the call, begins executing in the messaging kernel layer. This execution services the call by receiving the function call data and preparing a corresponding message. This is shown, for purposes of illustrating the logical process, as handled by the logical call format bubbles A1-X. A message buffer is allocated and attached to a message queue. Depending on the particular stub routine called, the contents of the message may contain different data defined by different specific message data structures. That is, each message is formatted by the appropriate call format bubble A1-X, using the function call data and the PID of the calling process.

The message is then logically passed to an A message state machine for sending. The A message state machine initiates a message transfer by first issuing a message descriptor identifying the location of the message and indicating, for example, that it is a new message being sent.

The destination of the message descriptor is the shared memory address of the message descriptor FIFO as present on the intended destination peer-level processor. The specific message descriptor FIFO is effectively selected based on the stub routine called and the data provided with the call. That is, for example, the messaging kernel layer 178 correlates the FSID provided with the call to the particular file system facility 164 that has mounted that particular file system. If the messaging kernel layer 178 is unable to correlate a FSID with a file system facility 164, as a consequence of a failure to export or mount the file system, the NFS request is returned to the client with an error.

Once the message descriptor is passed to the messaging kernel layer 312 of an appropriate peer-level facility, the multi-tasking kernel of the messaging kernel layer 310 blocks the sending process until a reply message has been received. Meanwhile, the multi-tasking of the layer 310 kernel continues to handle incoming messages, initiated by reading message descriptors from its descriptor FIFO, and requests for messages to be sent based on calls received through the stub routines A1-X.

The messaging kernel layer 312 is similar to the messaging kernel layer 310, though the implementation of the layer specifically with regard to its call format, return format, and stub routines B1-X differ from their A layer counterparts. Where, for example, the messaging kernel layer 312 is the messaging kernel layer 180 of the file system facility 164, the stub routines B1-X match the functions of the UFS 182 and device driver 188 that may be directly called in response to a message from another facility or that may receive a function call intended for another facility. Accordingly, the preparation and handling of messages, as represented by the B message parser, call format and return format bubbles, will be tailored to the file system facility. Beyond this difference, the messaging kernel layers 310, 312 are identical.

The B message state machine implemented by the multi-tasking kernel of the messaging kernel layer 312 receives a message descriptor as a consequence of the peer-level processor reading the message descriptor from its message descriptor FIFO. Where the message descriptor is initiating a new message transaction, i.e., the message modifier is zero or two, the B message state machine undertakes to copy the message pointed to by the message descriptor into a newly allocated message buffer in the local shared memory of its peer-level processor. If the message modifier indicates that the message is a reply to an existing message transaction, then the B message state machine assumes that the message has already been copied to the previously allocated buffer identified by the message descriptor. Finally, if the message descriptor modifier indicates that the message pointed to by the message is to be freed, the B message state machine returns it to the B multi-tasking kernel's free message buffer pool.

Received messages are initially examined to determine their message type. This step is illustrated by the B message parser bubble. Based on message type, a corresponding data structure is selected by which the message can be properly read. The process ID of the relevant servicing destination process is also read from the message and a context switch is made. The detailed reading of the message is illustrated as a series of return format bubbles B1-X. Upon reading the message, the messaging kernel layer 312 selects a stub routine, appropriate to carry out the function requested by the received message and performs a function call through the stub routine. Also, in making the function call, the data contained by the message is formatted as appropriate for transfer to the called routine.

3. IFC Communication Transactions

Figure 12:
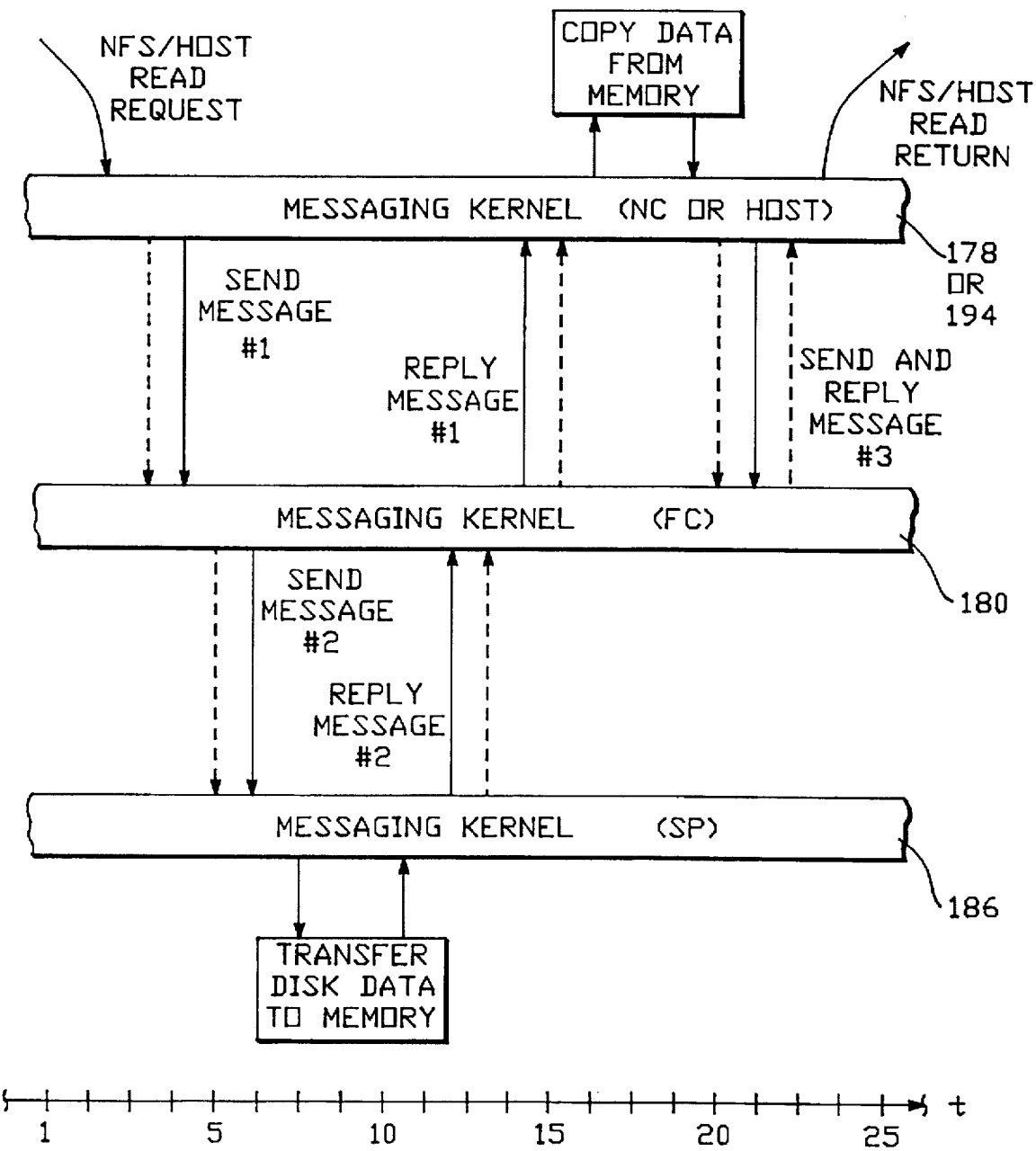
FIG. 12 is an illustration of a data flow for an LFS read request through the peer-level facilities of a preferred embodiment of the present invention.

FIG. 12 illustrates an exemplary series of communication transactions that are used for a network communications facility or a local host facility to obtain known data from the disk array 24 of the present invention. Similar series of communication transactions are used to read directory and other disk management data from the disk array. For clarity, the transfer of messages are referenced to time, though time is not to scale. Also for purposes of clarity, a pseudo-representation of the message structures is referenced in describing the various aspects of preparing messages.

a. LFS Read Transaction

At a time $t_2$, an NFS read request is received by the messaging kernel layer 178 of the network communications facility 162 from an executing (sending) process (PID= A$$). Alternately, the read request at $t_2$ could be from a host process issuing an equivalent LFS read request. In either case, a corresponding LFS message (message#1) is prepared (message#1.msg_type=fc_read; message#1.sender_pid= A$$; message#1.dest_pid=B$$).

The destination process (PID=B$$) is known to the messaging kernel layer 178 or 194 as the "manager" process of the file system facility that has mounted the file system identified by the FSID provided with the read request. The association of an FSID with a particular FS facility's PID is a product of the initialization of all of the messaging kernel layers.

In general, at least one "manager" process is created during initialization of each messaging kernel layer. These "manager" processes, directly or indirectly, register with a "name server manager" process (SC_NAME_SERVER) running on the host facility. Subsequently, other "manager" processes can query the "name server manager" to obtain the PID of another "manager" process. For indirect relations, the supervising "manager" process, itself registered with the "name server manager" process, can be queried for the PIDs of the "manager" processes that it supervises.

For example, a single named "file system administrator" (FC_VICE_PRES) process is utilized to supervise the potentially multiple FS facilities in the system 160. The FC_VICE_PRES process is registered directly with the "name server manager" (SC_NAME_SERVER) process. The "manager" processes of the respective FS facilities register with the "file system administrator" (FC_VICE_PRES) process—and thus are indirectly known to the "name server manager" (SC_NAME_SERVER). The individual FS "manager" processes register with the given FSIDs of their mounted file systems. Thus, the "name server manager" (SC_NAME_SERVER) can be queried by an NC facility for the PID of the named "file system administrator" (FC_VICE_PRES). The NC facility can then query for the PID of the unnamed "manager" process that controls access to the file system identified by a FSID.

The function of a non-supervising "manager" process is to be the known destination of a message. Thus, such a "manager" process initially handles the messages received in a communication transaction. Each message is assigned to an appropriate local worker process for handling. Consequently, the various facilities need know only the PID of the "manager" process of another facility, not the PID of the worker process, in order to send a request message.

At $t_3$, a corresponding message descriptor (md#1vme_ addr; mod=0), shown as a dashed arrow, is sent to the FS's messaging kernel layer 180.

At $t_4$, the FS messaging kernel layer 180 copies down the message (message#1), shown as a solid arrow, for evaluation, allocates a worker process to handle the request and, in the context of the worker process, calls the requested function of its UFS 182. If the required data is already present in the memory resource 18' no communication transaction with the S messaging kernel layer 186 is required, and the FS messaging kernel layer 180 continues immediately at $t_{14}$. However, if a disk read is required, the messaging kernel layer 180 is directed by the UFS 182 to initiate another communications transaction to request retrieval of the data by the storage facility 166. That is, the UFS 182 calls a storage device driver stub routine of the messaging kernel layer 180. A message (message#2), including a vector address referencing a buffer location in the memory resource 18' (message#2.msg_type=sp_read; message#2.vme_ addr=xxxxh; message#2.sender_pid=B$$; message#2.dest_pid=C$$), is prepared. At $t_5$, a corresponding message descriptor is sent (md#2vme_addr; mod=0) to the S messaging kernel layer 186.

At $t_6$, the S messaging kernel layer 186 copies down the message (message#2) for evaluation, allocates a worker process to handle the request and calls the requested function of its device driver 188 in the context of the worker process. Between $t_7$ and $t_{11}$, the requested data is transferred to the message specified location (message#2.vme_addr= xxxxh) in the memory resource 18'. When complete, the device driver returns to the calling stub routine of the S messaging kernel layer 186 with, for example, the successful (err=0) or unsuccessful (err=-1) status of the data transfer. Where there is an error, the message is updated (message#2.err=-1) and, at $t_{12}$, copied up to the messaging kernel layer 180 (md#2vme_addr). A reply message descriptor (md#2vme_addr; mod=1) is then sent at $t_{13}$ to the FC messaging kernel layer 180. However, where there is no error, a k_null_reply(msg) is used. This results in no copy of the unmodified message at $t_{12}$, but rather just the sending of the reply message descriptor (md#2vme_addr; mod=1) at $t_{13}$.

Upon processing the message descriptor and reply message (message#2), the FS messaging kernel layer 180 unblocks and returns to the calling process of the UFS 182 (message#2;.sender_pid=B$$). After completing any processing that may be required, including any additional communication transactions with the storage facility that might be required to support or complete the data transfer, the UFS 182 returns to the stub routine that earlier called the UFS 182. The message is updated with status and the data location in the memory resource 18' (message#1.err=0; message #2.vme_addr=xxxxh=message#1.vme_addr= xxxxh) and, at $t_{14}$, copied up to the messaging kernel layer 178 or 194 (md#1vme_addr). A reply message descriptor (md#1vme_addr; mod=1) is then sent at $t_{15}$ to the messaging kernel layer of the NC or local host, as appropriate.

The messaging kernel layer 178 or 196 processes the reply message descriptor and associated message. As indicated between $t_{16}$ and $t_{19}$, the messaging kernel layer 178 or 196, in the context of the requesting process (PID=A$$), is responsible for copying the requested data from the memory resource 18' into its peer-level processor's local shared memory. Once completed, the messaging kernel layer 178 or 196 prepares a final message (message#3) to conclude its series of communication transactions with the FS messaging kernel layer 180. This message is the same as the first message (message#3=message#1), though updated by the FS facility as to message type (message#3.msg_type=fc_ read_release) to notify the FC facility that it no longer requires the requested data space (message#3.vme_addr= xxxxh) to be held. In this manner, the FC facility can maintain its expedient, centralized control over the memory resource 18'. A corresponding message descriptor (md#3vme_addr=md#1vme_addr; mod=0) is sent at $t_{20}$.

At $t_{21}$, the release message (message#3) is copied down by the FC messaging kernel layer 180, and the appropriate disk buffer management function of the UFS 182 is called, within the context of a worker process of the relevant manager process (message#3.dest_pid=B$$), to release the buffer memory (message#3.vme_addr=xxxxh). Upon completion of the UFS memory management routine, the relevant worker process returns to the stub routine of the FS messaging kernel layer 180. The worker process and the message (message#3) are deallocated with respect to the FS facility and a reply message descriptor (md#3vme_addr; mod=1) is returned to the messaging kernel layer 178 or 196, whichever is appropriate.

Finally, at $t_{23}$, the messaging kernel layer 178 or 196 returns, within the context of the relevant process (PID= A$$), to its calling routine. With this return, the address of the retrieved data within the local shared memory is provided. Thus, the relevant process is able to immediately access the data as it requires.

b. LFS Write Transaction

FIG. 13 illustrates an exemplary series of communication transactions used to implement an LFS write to disk.

Beginning at a time $t_1$, an LFS write request is received by the messaging kernel layer 178 of the network communications facility 162 from an executing process (PID=A$$) in response to an NFS write request. Alternately, the LFS write request at $t_1$ could be from a host process. In either case, a corresponding message (message#1) is prepared (message#1.msg_type=fc_write; message#1.sender_pid= A$$; message#1.dest_pid=B$$) and, at $t_2$, its message descriptor (md#1vme_addr; mod=0) is sent to the FC messaging kernel layer 180.

At $t_3$, the FC messaging kernel layer 180 copies down the message (message#1) for evaluation, allocates a worker process to handle the request by the manager process (PID=B$$), which calls the requested function of its UFS 182. This UFS function allocates a disk buffer in the memory resource 18' and returns a vector address (vme_addr= xxxxh) referencing the buffer to the FC messaging kernel layer 180. The message is again updated (message#2.vme_ addr=xxxxh) and copied back to the messaging kernel layer 178 or 194 (md#1vme_addr). A reply message descriptor (md#1vme_addr; mod=1) is then sent back to the messaging kernel layer 178 or 194, at $t_5$.

Between $t_6$ and $t_9$, the relevant process (PID=A$$) of the NC or host facility copies data to the memory resource 18'. When completed, the messaging kernel layer 178 or 194 is again called, at $t_9$, to complete the write request. A new message (message#2=message#1) is prepared, though updated with the amount of data transferred to the memory resource 18' and message type (message#2msg_type=fc_ write_release), thereby implying that the FS facility will have control over the disposition of the data. Preferably, this message utilizes the available message buffer of message#1, thereby obviating the need to allocate a new message buffer or to copy data from message#1. The message descriptor (md#2vme_addr=md#1vme_addr; mod=0) for this message is sent at $t_{10}$.

The message is copied down by the FC messaging kernel layer 180 and provided to a worker process by the relevant manager process (message#2.dest_pid=B$$). While a reply message descriptor might be provided back to the messaging kernel layer 178 or 194 immediately, at $t_{12}$, thereby releasing the local shared memory buffer, the present invention adopts the data coherency strategy of NFS by requiring the data to be written to disk before acknowledgment. Thus, upon copying down the message at $t_{11}$, the messaging kernel layer 180 calls the UFS 182 to write the data to the disk array 24'. The UFS 182, within the context of the relevant worker process, calls the messaging kernel layer 180 to initiate another communication transaction to request a write out of the data by the storage facility 166. Thus, a storage device driver stub routine of the messaging kernel layer 180 is called. A message (message#3), including the shared memory address of a buffer location in the memory resource 18' (message#3.msg_type=sp_write; message#2.vme_ addr=xxxxh; message#2.sender_pid=B$$; message#2.dest_pid=C$$), is prepared. At $t_{16}$, a corresponding message descriptor is sent (md#3vme_addr; mod=0) to the S messaging kernel layer 186.

At $t_{17}$, the S messaging kernel layer 186 copies down the message (message#3) for evaluation, allocates a worker process to handle the request by the manager process (PID=C$$), which calls the requested function of its device driver 188. Between $t_{18}$ and $t_{22}$, the requested data is transferred from the message specified location (message#3.vme_addr=xxxxh) of the memory resource 18'. When complete, the device driver returns to the calling stub routine of the S messaging kernel layer 186 with, for example, the status of the data transfer (err=0). The message is updated (message#33.err=0) and, at $t_{23}$, copied up to the messaging kernel layer 180 (md#3vme_addr). A reply message descriptor (md#3vme_addr; mod=1) is then sent at $t_{24}$ to the FC messaging kernel layer 180.

Upon processing the message descriptor and reply message (message#3), the FC messaging kernel layer 180 returns to the calling process of the UFS 182 (message#3.sender_pid=B$$). After completing any UFS processing that may be required, including any additional communication transactions with the storage facility that might be required to support or complete the data transfer, the UFS 182 returns to the messaging kernel layer 180. At this point, the UFS 182 has completed its memory management of the memory resource 18'. At $t_{25}$, the messaging kernel layer 180 sends the reply message descriptor (md#2vme_addr; mod=1) to the messaging kernel layer 178 or 196, as appropriate, to indicate that the data has been transferred to the disk array resource 24'.

Finally, at $t_{26}$, the messaging kernel layer 178 or 196 returns, within the context of the relevant worker process, to its calling routine.

c. NC/Local Host Transfer Transaction

FIG. 14 illustrates the communication transaction and delivery of data, as provided from a NC facility process (PID=A$$), to an application program executing in the application program layer of the local host facility. The packet, for example, could contain new routing information to be added to the route data base. However, since the NC facility does not perform any significant interpretation of non-NF$ packets beyond identification as an IP packet, the packet is passed to the local host facility. The local host, upon recognizing the nature of the non-NFS packet, will pass it ultimately to the IP client, as identified by the packet, for interpretation. In this example, the IP client would be the "route" daemon.

Thus, the transaction begins at $t_2$, with the NC messaging kernel layer 178 writing a message descriptor (md#1.vme_addr; mod=0) to the host messaging kernel layer 194. The referenced message (message#1.msg_type=nc_recv_ip_pkt; message#1.sender_pid=D$$; message#1.dest_pid=E$$) is copied down, at $t_3$, by the host messaging kernel layer 194. A reply message descriptor (md#1.vme_addr; mod=3) is then returned to the NC messaging kernel layer 178 at $t_4$.

The packet is then passed, by the local host messaging kernel layer 194, to the TCP/UDP layers 204 of the local host facility for processing and, eventually, delivery to the appropriate application program.

As shown at $t_{14}$, the application program may subsequently call the host messaging kernel layer 194, either directly or indirectly through the system call layer. This call could be, for example, issued as a consequence of the application program making a system call layer call to update the host's IP route database. As described earlier, this call has been modified to also call the host messaging kernel layer 194 to send a message to the NC facility to similarly update its IP route database. Thus, a message descriptor (md#2.vme_addr; mod=0) is sent at $t_{15}$ to the NC messaging kernel layer 178. The referenced message (message#2.msg_type=nc_add_route; message#2.sender_pid=E$$; message#1.dest_pid=D$$) is copied up, at $t_{16}$, by the NC messaging kernel layer 178. The NC messaging kernel layer 178 then calls the NC facility function to update the IP route database. Finally, a reply message descriptor (md#2.vme_addr; mod=1) is returned to the local host messaging kernel layer 194 at $t_{17}$.

d. NC/NC Route Transfer Transaction

FIG. 15 illustrates the routing, or bridging, of a data packet between two NC facility processes. The two NC processes may be executing on separate peer-level processors, or exist as two parallel processes executing within the same NC facility. The packet, for example, is intercepted at the IP layer within the context of the first process (PID=A$$). The IP layer identifies the logical NC facility that the packet is to be routed to calls the messaging kernel layer 178 to prepare an appropriate message (message#1). The data packet itself is copied to a portion of the memory resource 18' (vme_addr=xxxxh) that is reserved for the specific NC facility; this memory is not under the control of any FS facility.

Thus, at $t_2$, the NC messaging kernel layer 178 writes a message descriptor (md#1.vme_addr; mod=0) to the second messaging kernel layer 178. The referenced message (message#1.msg_type=nc_forward_ip_pkt; message#1.sender_pid=F$$; message#1.dest_pid=G$$; message#1.vme_addr=xxxxh; message#1.ethernet_dst_net=xx) is copied down, at $t_3$, by the second NC messaging kernel layer 178. The data packet is then copied, between $t_4$ and $t_8$, from the memory resource 18' to the local shared memory of the second NC peer-level processor.

Since the first NC facility must manage its portion of the memory resource 18' the second NC messaging kernel layer 178, at $t_9$, returns a reply message descriptor (md#1.vme_addr; mod=1) back to the first NC messaging kernel layer 178 $t_9$. This notifies the first NC facility that it no longer requires the memory resource 18' data space (message#1.vme_addr=xxxxh) to be held. In this manner, the first NC facility can maintain expedient, centralized control over its portion of the memory resource 18'.

The packet data is then passed, by the second NC messaging kernel layer 178, to the IP layer of its NC facility for processing.

4. Detailed Communication Transaction Messages, Syntax, and Semantics

A Notation for Communication Transactions

A terse notation for use in describing communication transactions has been developed. This notation does not directly represent the code that implements the transactions, but rather is utilized to describe them. A example and explanation of the notation is made in reference to a LFS type transaction requesting the attributes of a given file.

The communication transaction:

fc_get_attributes(FILE,ATTRIBUTES);

identifies that a message with type FC_GET_ATTRIBUTES, the expected format of the message, when sent to the FS facility, for example, is a typedef FILE, and that when the message is returned, its format is a typedef ATTRIBUTES.

A second convention makes it very clear when the FS facility, for example, returns the message in the same format that it was originally sent. The communication transaction:

get_buffer(BUFFER,***);

describes a transaction in which the NC facility, for example, sends a typedef BUFFER, and that the message is returned using the same structure.

If a facility can indicate success by returning the message unchanged (k_null_reply()), then the format is:

free_buffer(BUFFER,*);

Sometimes, when facilities use standard structures, only some of the fields will actually have meaning. The following notation identifies meaningful fields:

get_buffer( BUFFER{data_len},

***{data_len,data_ptr});

This transaction notation describes the same transaction as get_buffer above, but in more detail. The facility requests a buffer of a particular length, and the responding facility returns a pointer to the buffer along with the buffer's actual length.

a. FS Facility Communication Transactions

The communication transactions that the FS facilities of the present invention recognizes, and that the other facilities of the present invention messaging kernel layer recognize as appropriate to interact with the FS facility, are summarized in Table 4 below.

TABLE 4

Summary of FS Communication Transactions

LFS Configuration Management

| fc_find_manager | (FC_MOUNT_T,***{errno,fc_pid} ) |
| fc_mount | (FC_MOUNT_T,***{errno,fc_pid,file} ) |
| fc_unmount | (FC_STD_T{partition.fsid},*{errno} ) |

LFS Data Transfer Messages

| fc_read | ( FC_RDWR_T{un.in}, |
| | ***{errno,un.out.{bd,vattr}} ) |
| fc_write | ( FC_RDWR_T{un.in}, |
| | ***{errno,un.out.{bd,vattr}} ) |
| fc_readdir | ( FC_RDWR_T{un.in}, |
| | ***{errno,un.out.{bd,new_offset}} ) |
| fc_readlink | ( FC_RDWR_T{un.in.file,un.in.cred}, |
| | ***{errno,un.out.bd} ) |
| fc_release | ( FC_RDWR_T{un.out.bd},*{errno} ) |

LFS File Management Messages

| fc_null | ( K_MSG,***) |
| fc_null_null | ( K_MSG,*) |
| fc_getattr | ( FC_STD_T{cred,file,un.mask}, |
| | FC_FILE_T{errno,vattr} ) |
| fc_setattr | ( FC_SATTR_T, FC_FILE_T{errno,vattr} ) |
| fc_lookup | ( FC_DIROP_T{cred,where}, FC_FILE_T ) |
| fc_create | ( FC_CREATE_T, FC_FILE_T ) |
| fc_remove | ( FC_DIROP_T{cred,where}, *{errno} ) |
| fc_rename | ( FC_RENAME_T, *{errno} ) |
| fc_link | ( FC_LINK_T, *{errno} ) |
| fc_symlink | ( FC_SYMLINK_T, *{errno} ) |
| fc_rmdir | ( FC_DIROP_T{cred,where}, *{errno} ) |
| fc_statfs | ( FC_STATFS_T{fsid},***) |

VOP, VFS and Other Miscellaneous LFS Messages

| fc_fsync | ( FC_STD_T{cred,file}, *{errno} ) |
| fc_access | ( FC_STD_T{cred,file,mode}, *{errno} ) |
| fc_syncfs | ( FC_STD_T{cred,fsid}, *{errno} ) |

The use of these communication transactions are best illustrated from the perspective of their use.

An FS facility process named FC_VICE_PRES directs the configuration of all FS facilities in the system 160. Even with multiple instantiations of the FS facility, there is only one FC_VICE_PRES process. There are also one or more unnamed manager processes which actually handle most requests. Each file system—or disk partition—in the system 160 belongs to a particular manager; however, a manager may own more than one file system. Since managers are unnamed, would-be clients of a file system first check with FC_VICE_PRES to get the FS facility pid of the appropriate manager. Thus, the FC_VICE_PRES process does no actual work. Rather, it simply operates to direct requests to the appropriate manager.

To provide continuous service, managers must avoid blocking. Managers farm out requests that would block to a pool of unnamed file controller worker processes. These details are not visible to FS facility clients.

The significant message structures used by the FS facility are given below. For clarity, the commonly used structures are described here. An FSID (file system identifier) identifies an individual file system. An FSID is simply the UNIX device number for the disk array partition which the file system lives on. An FC_FH structure (file controller file handle) identifies individual files. It includes an FSID to identify which file system the file belongs to, along with an inode number and an inode generation to identify the file itself.

Start-up, Mounting and Unmounting

Once the FC peer-level processor has booted an instantiation of the FS facility, the first FS facility to boot spawns an FC_VICE_PRES process which, in turn, creates any managers it requires, then waits for requests. Besides a few "internal" requests to coordinate the mounting and unmounting of files systems is the operation of multiple file system facilities, the only request FC_VICE_PRES accepts is:

fc_find_manager (FC_MOUNT_T, , ***{errno fc_pid});

The input message includes nothing but an FSID identifying the file system of interest. The successful return value is an FS facility process id which identifies the manager responsible for this file system. Having found the manager, a client facility with the appropriate permissions can request that a file system be made available for user requests (mount) or unavailable for user requests (unmount). These requests are made by the local host facility, through its VFS/LFS client interface; requests for the mounting and unmounting of file systems are not received directly from client NC facilities.

The transaction:

fc_mount (FC_MOUNT_T,***{errno fc_pid,file});

returns the root file handle in the requested file system.

The unmount transaction:

fc_unmount (FC_STD_T{fsid},*{errno});

returns an error code. (The * in the transaction description indicates that a k_null_reply() is possible, thus the caller must set errno to zero to detect a successful reply.)

Data Transfer Messages

There are four common requests that require the transfer of data. These are FC_READ, FC_READDIR, FC_READLINK, and FC_WRITE. The FS facility handles these requests with a two message protocol. All four transactions are similar, and all use the FC_RDWR_T message structure for their messages.

```
typedef struct  {
    void        *buf;       /* Buffer id. Valid if
                               non-NULL. */
    vme_t       addr;       /* Pointer to data. */
    int         count;      /* Length of data. */
} FC_BUF_DESC;
#define FC_RDWR_BUFS    2
typedef struct  {
    int         type;
    int         errno;
    union {
        struct {
            FC_CRED     cred;   /* credentials */
            int         flags;
            FC_FH       file;
```

```
            int        offset;
            int        count;
        } in;
        struct {
            /*
             * Structure used in response to
             * fc_release message.
             */
            FC_BUF_DESC    bd[FC_RDWR_BUFS];
                           /* Buffer descriptors. */
            FC_VATTR       vattr;
        } out;
    } un;
} FC_RDWR_T;
```

The FC_READ transaction is described in some detail. The three by other transactions are described by comparison. A read data communication transactions is:

```
fc_read      ( FC_RDWR_T{un.in},
             ***{errno,un.out.{bd,vattr}} );
```

As sent by a client facility, the "in" structure of the union is valid. It specifies a file, an offset and a count. The FS facility locks the buffers which contain that information; a series of message transactions with the S facility may be necessary to read the file from disk. In its reply, the FS facility uses the "out" structure to return both the attributes of the file and an array of buffer descriptors that identify the VME memory locations holding the data. A buffer descriptor is valid only if it's "buf" field is non-zero. The FS facility uses non-zero values to identify buffers, but to client facilities they have no meaning. The attributes and buffer descriptors are valid only if no error has occurred. For a read at the end of a file, there will be no error, but all buffer descriptors in the reply will have NULL "buf" fields.

After the client facility has read the data out of the buffers, it sends the same message back to the FS facility a second time. This time the transaction is:

fc_release (FC_RDWR_T{un.out.bd},*{errno});

This fc_release request must use the same message that was returned by the fc_read request. In the reply to the fc_read, the FS facility sets the message "type" field of the message to make this work. The following pseudo-code fragment illustrates the sequence:

msg=(FC_RDWR_T*)k_alloc_msg();
    initialize_message;
    msg=k_send(msg, fc_pid);
    copy_data_from_buffers_into local_memory;
    msg=k_send(msg, fc_pid);

The same message, or an exact duplicate, must be returned because it contains the information the FS facility needs to free the buffers.

Although the transaction summary of Table 4 shows just one fc_release transaction, there are really four: one for each type of data transfer: fc_read_release, fc_write_release, fc_readdir_release and fc_read_link_release. Since the FS facility sets the "type" field for the second message, this makes no difference to the client facility.

If the original read transaction returned an error, or if none of the buffer descriptors were valid, then the release is optional.

The FC_WRITE transaction is identical to FC_READ, but the client facility is expected to write to the locations identified by the buffer descriptors instead of reading from them.

The FC_READDIR transaction is similar to read and write, but no file attributes are returned. Also, the specified offset is really a magic value—also sometimes referred to as a magic cookie—identifying directory entries instead of an absolute offset into the file. This matches the meaning of the offset in the analogous VFS/VOP and NFS versions of readdir. The contents of the returned buffers are "dirent" structures, as described in the conventional UNIX "getdents" system call manual page.

The FC_READLINK transaction is the simplest of the four communication transactions. It returns no file attributes and, since links are always read in their entirety, it requires no offset or count.

In all of these transactions, the requested buffers are locked during the period between the first request and the second. Client facilities should send the fc_release message as soon as possible, because the buffer is held locked until they do, and holding the lock could slow down other client facilities when requesting the same block.

In the preferred embodiment of the present invention, these four transactions imply conventional NFS type permission checking whenever they are received. Although conventional VFS/UFS calls do no permission checking, in NFS and the LFS of the present invention, they do. In addition, the FS facility messages also supports a "owner can always read" permission that is required for NFS.

LFS File Management Messages

The LFS communication transactions, as described below, are similar to conventional NFS call functions with the same names.

The communication transaction:

fc_null (K_MSG, ***);

does nothing but uses k_reply().

The communication transaction:

fc_null_null(K_MSG,*);

also does nothing, but uses the quicker k_null_reply(). Both of these are intended mainly as performance tools for measuring message turnaround time.

The communication transaction:

```
fc_getattr (FC_STD_T{cred,file,un.mask},
            FC_FILE_T{errno,vattr} );
``` gets the vnode attributes of the specified file. The mask specifies which attributes should be returned. A mask of FC_ATTR_ALL gets them all. The same structure is always used, but for un-requested values, the fields are undefined.

The communication transaction:

fc_setattr (FC_SATTR_T,FC_FILE_T{errno,vattr});

sets the attributes of the specified file. Like fc_getattr, fc_setattr uses a mask to indicate which values should be set. In addition, the special bits FC_ATTR_TOUCH_[AMC]TIME can be set to indicate that the access, modify or change time of the file should be set to the current time on the server. This allows a Unix "touch" command to work even if the times on the client and server are not well matched.

The communication transaction:

fc_lookup (FC_DIROP_T{cred,where},FC_FILE_T);

searches a directory for a specified file name, returning the file and it's attributes if it exists. The "where" field of FC_DIROP_T is an FC_DIROP structure which contains a file, a name pointer, and a name length. The name pointer contains the vme address of the name. The name may be up to 256 characters long, and must be in memory that the FS facility can read.

The communication transaction:

fc_create(FC_CREATE_T,FC_FILE_T);

creates files. The FC_CREATE_T describes what type of file to create and where. The vtype field may be used to specify any file type including directories, so mkdir is not supported. If the "FC_CREATE_EXCL" bit is set in the flag field, then fc_create will return an error if the file already exists. Otherwise, the old file will be removed before creating the new one.

The communication transaction:

fc_remove (FC_DIROP_T{cred,where},*{errno});

removes the specified name from the specified directory.

The communication transaction:

fc_rename (FC_RENAME_T,*);

changes a file from one name in one directory to a different name in a (possibly) different directory in the same file system.

The communication transaction:

fc_link (FC_LINK_T,*{errno});

links the specified file to a new name in a (possibly) new directory.

The communication transaction:

fc_symlink (FC_SYMLINK_T,*{errno});

creates the specified symlink.

The communication transaction:

fc_rmdir (FC_DIROP_T{cred,where},*{errno});

removes a directory. The arguments for fc_rmdir are like those for fc_remove.

The communication transaction:

fc_statfs (FC_STATFS_T{fsid},***);

returns file system statistics for the file system containing the specified file.

VFS/VOP LFS Support Transactions

The communication transactions described below are provided to support the VFS/VOP subroutine call interface to the LFS client layer. Most VOP calls can be provided for using the messages already defined above. The remaining VOP function call support is provide by the following transactions.

The communication transactions:

fc_fsync (FC_STD_T{cred,file},*{errno});
fc_syncfs (FC_STD_T{cred,fsid), *{errno});

ensure that all blocks for the referenced file or file system, respectively, are flushed.

The communication transaction:

fc_access(FC_STD_T{cred,file,mode},*{errno});

determines whether a given type of file access is legal for specified credentials ("cred") on the specified file The mode value is "FC_READ_MODE" "FC_WRITE_MODE" or "FC_EXEC_MODE" If the mode is legal, the returned errno is zero.

Table 5 lists the inter-facility message types supported by the FS facility.

TABLE 5

FS Facility Message Types
(K_MSGTYPE)

| #define FC_ID ( (long)( ('F'<<8) ! ('C') ) << 16 ) | |
| --- | --- |
| \* External Messages *\ | |
| #define FC_FIND_MANAGER | ( 1 ! FC_ID ) |
| #define FC_MOUNT | ( 2 ! FC_ID ) |
| #define FC_UNMOUNT | ( 3 ! FC_ID ) |
| #define FC_READ | ( 4 ! FC_ID ) |
| #define FC_WRITE | ( 5 ! FC_ID ) |

TABLE 5-continued

FS Facility Message Types
(K_MSGTYPE)

| #define FC_READDIR | ( 6 ! FC_ID ) |
| --- | --- |
| #define FC_READLINK | ( 7 ! FC_ID ) |
| #define FC_READ_RELEASE | ( 8 ! FC_ID ) |
| #define FC_WRITE_RELEASE | ( 9 ! FC_ID ) |
| #define FC_READDIR_RELEASE | ( 10 ! FC_ID ) |
| #define FC_READLINK_RELEASE | ( 11 ! FC_ID ) |
| #define FC_NULL | ( 12 ! FC_ID ) |
| #define FC_NULL_NULL | ( 13 ! FC_ID ) |
| #define FC_GETATTR | ( 14 ! FC_ID ) |
| #define FC_SETATTR | ( 15 ! FC_ID ) |
| #define FC_LOOKUP | ( 16 ! FC_ID ) |
| #define FC_CREATE | ( 17 ! FC_ID ) |
| #define FC_REMOVE | ( 18 ! FC_ID ) |
| #define FC_RENAME | ( 19 ! FC_ID ) |
| #define FC_LINK | ( 20 ! FC_ID ) |
| #define FC_SYMLINK | ( 21 ! FC_ID ) |
| #define FC_RMDIR | ( 22 ! FC_ID ) |
| #define FC_STATFS | ( 23 ! FC_ID ) |
| #define FC_FSYNC | ( 24 ! FC_ID ) |
| #define FC_ACCESS | ( 25 ! FC_ID ) |
| #define FC_SYNCFS | ( 26 ! FC_ID ) |
| /* Internal Messages. */ | |
| #define FC_REG_PARTITION | ( 27 ! FC_ID ) |
| #define FC_UNREG_PARTITION | ( 28 ! FC_ID ) |

The FS facility message structures are listed below.

```
/* Standard Structure which handles many messages. */
typedef struct {
    K_MSGTYPE    type;
    long         errno;
    FC_CRED      cred;     /* Access credentials */
    FC_FH        file;
    union {
        FC_FSID  fsid;     /* For fc_get_server. */
        long     mode;     /* {READ,WRITE,EXEC} for
                              fc_access. */
        K_PID    pid;      /* FS facility pid of
                              server. */
        long     mask;     /* Mask attributes.
                              (FC_ATTR_*). */
    } un;
} FC_STD_T;
/* Structure for fs control -- mounting, unmounting. */
typedef struct {
    K_MSGTYPE    type;
    long         errno;
    long         fc;       /* IN: Which FC to use. (i.e.
                              0, 1, . . .)*/
    long         flags;    /* IN: Mount flags. */
    FC_PARTITION partition; /* IN: Describes SP
                              partition to use. */
    K_PID        fc_pid;   /* OUT: PID of manager for FS.
                              */
    FC_FH        file;     /* OUT: Root file handle of
                              file system. */
} FC_MOUNT_T;
typedef struct {
    K_MSGTYPE    type;
    FC_CRED      cred;
    FC_FH        file;
    long         mask;     /* Mask attributes.
                              (FC_ATTR_*) */
    FC_SATTR     sattr;
} FC_SATTR_T;
typedef struct {
    K_MSGTYPE    type;
    long         errno;
    FC_FH        file;
    FC_VATTR     vattr;
} FC_FILE_T;
```

```
typedef struct {
    void        *buf;
    vme_t       addr;       /* fc returned data. */
    long        count;      /* fc returned data length. */
} FC_BUF_DESC;
    The FC_BUF_DESC structure is used in the two
message data transfer protocols. A typical sequence
is:
fc_read     ( FC_RDWR_T{flags,un.in},
              FC_RDWR_T{flags,un.out} );
fc_release  ( FC_RDWR_T{flags,un.out},
              FC_RDWR_T{flags,un.out} )
    Note that the "out" union member is the output
for the first message and the input for the second.
#define FC_RDWR_BUFS 2
typedef struct {
    K_MSGTYPE   type;
    long        errno;
    union {
        struct {
            FC_FH       file;       /* For first
                                       message. */
            FC_CRED     cred;
            long        flags;
            long        offset;     /* User requested
                                       file offset. */
            long        count;      /* User requested
                                       count. */
        } in;
        struct {
            /* Structure used in response to
               fc_release message. */
            FC_BUF_DESC bd[FC_RDWR_BUFS];
                                    /* Buffer
                                       descriptor. */
            FC_VATTR    vattr;      /* For
                                       responses. */
            long        new offset; /* For READDIR.
                                       */
        }
    } un;
} FC_RDWR_T;
/* #define FC_RDWR_SYNC      0x0001
/* #define FC_RDWR_NOCACHE   0x0002  /* Don't cache
                                        buffer. */
    This structure is used in those operations that
take a directory file handle and a file name within
that directory, namely "lookup", "remove", and
"rmdir".
typedef struct {
    K_MSGTYPE   type;
    long        errno;
    FC_CRED     cred;
    FC_DIROP    where;      /* File to look up
                               or remove. */
} FC_DIROP_T;
```

Not all fields that can be set can be specified in a create, so instead of including FC_SATTR, only the values that can be set as included.

```
typedef struct {
    K_MSGTYPE   type;
    FC_CRED     cred;
    FC_DIROP    where;
    short       flag;
    short       vtype;      /* Type for new file. */
    u_short     mode;       /* Mode for new file. */
    short       major_num;  /* Major number for
                               devices. */
    short       minor_num;  /* Minor number for
                               devices. */
} FC_CREATE_T;
/* Values for the flag. */
#define FC_CREATE_EXCL 0x0001 /* Exclusive. */
typedef struct {
```

```
    K_MSGTYPE   type;
    long        errno;
    FC_CRED     cred;
    FC_FH       from;
    FC_DIROP    to;
} FC_RENAME_T;
typedef struct {
    K_MSGTYPE   type;
    long        errno;
    FC_CRED     cred;
    FC_FH       from;
    FC_DIROP    to;
} FC_LINK_T;
typedef struct {
    K_MSGTYPE   type;
    long        errno;
    FC_CRED     cred;
    FC_DIROP    from;       /* File to create. */
    u_short     mode;       /* File permissions. */
    vme_t       to_ptr;     /* Pointer to contents
                               for symlink */
    long        to_len;
} FC_SYMLINK_T;
typedef struct {
    K_MSGTYPE   type;
    long        errno;
    FC_FSID     fsid;
    u_long      bsize;      /* Block size. */
    u_long      blocks;     /* Total number of
                               blocks. */
    u_long      bfree;      /* Free blocks. */
    u_long      bavail;     /* Blocks available to
                               non-priv users. */
    u_long      files;      /* Total number of file
                               slots. */
    u_long      ffree;      /* Number of free file
                               slots. */
    u_long      favail;     /* File slots available
                               to non-priv users. */
    struct timeval stime;   /* Server's current
                               time of day. */
} FC_STATFS_T;
#define FC_MAXNAMLEN        255
#define FC_MAXPATHLEN       1024
struct fc_dirent {
    u_long      d_off;      /* offset of next disk
                               directory entry */
    u_long      d_fileno;   /* file number of entry */
    u_short     d_reclen;   /* length of this record */
    u_short     d_namlen;   /* length of string in
                               d_name */
    char d_name            /* name (up to
    [FC_MAXNAMLEN + 1];       MAXNAMLEN + 1)
                               */
};
``` b. NC Facility Communication Transactions

The communication transactions that the NC facilities of the present invention recognize, and that the other messaging kernel layers of the present invention messaging kernel layer recognize as appropriate to interact with the NC facility, are summarized in Table 6 below. The NC facility also uses and recognizes the FS facility communication transactions described above.

TABLE 6

Summary of NC Communication Transactions

Network Interface IOCTL Messages

| | |
|---|---|
| nc_register_dl | ( NC_REGISTER_DL_T,***{status} ) |
| nc_set_promis | ( NC_IFIOCTL_T{unit,promis},<br>***{status} ) |
| nc_add_multi | ( NC_IFIOCTL_T{unit,mc_addr},<br>***{status} ) |

TABLE 6-continued

Summary of NC Communication Transactions

| | |
|---|---|
| nc_del_multi | ( NC_IFIOCTL_T{unit,mc_addr}, ***{status} ) |
| nc_set_ifflags | ( NC_IFIOCTL_T{unit,flags}, ***{status} ) |
| nc_get_ifflags | ( NC_IFIOCTL_T{unit}, ***{status,flags} ) |
| nc_set_ifmetric | ( NC_IFIOCTL_T{unit,metric}, ***{status}) |
| nc_set_ifaddr | ( NC_IFIOCTL_T{unit,if_addr}, ***{status} ) |
| nc_get_ifaddr | ( NC_IFIOCTL_T{unit}, ***{status,if_addr} ) |
| nc_get_ifstat | ( NC_IFSTATS_T,*** ) |
| nc_set_macflags | ( NC_IFIOCTL_T{unit,flags}, ***{status} ) |
| nc_get_macflags | ( NC_IFIOCTL_T{unit}, ***{status,flags} ) |
| nc_set_ip_braddr | ( NC_INIOCTL_T, *** ) |
| nc_get_ip_braddr | ( NC_INIOCTL_T, *** ) |
| nc_set_ip_netmask | ( NC_INIOCTL_T, *** ) |
| nc_get_ip_netmask | ( NC_INIOCTL_T, *** ) |
| nc_add_arp_entry | ( NC_ARPIOCTL_T, *** ) |
| nc_del_arp_entry | ( NC_ARPIOCTL_T, *** ) |
| nc_get_arp_entry | ( NC_ARPIOCTL_T, *** ) |
| nc_add_route | ( NC_RTIOCTL_T, ***) |
| nc_del_route | ( NC_RTIOCTL_T, ***) |
| NFS Configuration Messages | |
| nc_nfs_start | ( NC_NFS_START_T, * ) |
| nc_nfs_export | ( NC_NFS_EXPORT_T, ***{errno} ) |
| nc_nfs_unexport | ( NC_NFS_UNEXPORT_T, ***{errno} ) |
| nc_nfs_getstat | ( NC_NFS_STATS_T,*** ) |
| Network Interface Data Messages | |
| nc_xmit_pkt | ( NC_PKT_IO_T,* ) |
| nc_recv_dl_pkt | ( NC_PKT_IO_T,* ) |
| nc_recv_ip_pkt | ( NC_PKT_IO_T,* ) |
| nc_recv_promis_pkt | ( NC_PKT_IO_T,*) |
| nc_forward_ip_pkt | ( NC_PKT_IO_T,* ) |
| Secure Authentication Messages | |
| ks_decrypt | ( KS_DECRYPT_T{netname,netnamelen, desblock},***{rpcstatus,ksstatus, desblock} ) |
| ks_getcred | ( KS_GETCRED_T{netname,netnamelen}, ***{rpcstatus,ksstatus,cred} ) |

A network communications facility can exchange messages with the host facility, file system facility and any other network communications facility within the system 160. The host facility will exchange messages with the network communications facility for configuring the network interfaces, managing the ARP table and IP routing table, and sending or receiving network packets. In addition, the host facility will exchange messages with the network communications facility for configuring the NFS server stack and to respond in support of a secure authentication service request. The network communications facility will exchange messages with the file system facility for file service using the external FS communication transactions discussed above. Finally, a network communication facility will exchange messages with other network communication facilities for IP packet routing.

System Call Layer Changes

The exportfs(), unexport(), rtrequest(), arpioctl() and in_control() function calls in the system call layer have been modified. The exportfs() and unexport() functions are called to export new file systems and unexport an exported file system, respectively. A call to these modified functions now also initiates the appropriate NC_NFS_EXPORT or NC_NFS_UNEXPORT communication transactions to each network facility.

The rtrequest() function is called to modify the kernel routing table. A call to the modified function now also initiates an appropriate NC communication transaction (NC_ADD_ROUTE for adding a new route or NC_DEL_ROUTE for deleting an existing route) to each network facility.

The arpioctl() function is called to modify the kernel ARP table. This function has now been modified to also initiate the appropriate NC communication transaction (NC_ADD_ARP for adding a new ARP entry or NC_DEL_ARP for deleting an existing entry) to each network facility.

Finally, the in_control() function is called to configure the Internet Protocol parameters, such as setting the IP broadcast address and IP network mask to be used for a given interface. This function has been modified also initiate the appropriate NC communications transaction (NC_SET_IP_BRADDR or NC_SET_IP_NETMASK) to the appropriate network facility.

NC Facility Initialization

When a network communications facility is initialized following bootup, the following manager processes are created:

nc_nfs_vp<n> NFS server process for processing NFS_EXPORT and NFS_UNEXPORT communication transactions from the host;

nc_dlctrl<n> Network interface control process for processing IOCTL communication transactions from the host; and nc_dlxmit<i> Network transmit process for processing NC_XMIT_PKT and NC_FWD_IP_PKT communication transactions.

where:

<n> is the network processor number: 0,1,2, or 3.

<i> is the network interface (LAN) number: 0,1,2,3,4,5,6, or 7.

Once initialized, the NC facilities reports the "names" of these processes to a SC_NAME_SERVER manager process, having a known default PID, started and running in the background, of the host facility. Once identified, the host facility can configure the network interfaces (each LAN connection is seen as a logical and physical network interface). The following command is typically issued by the Unix start-up script for each network interface:

ifconfig<interface name> <host name> <options> up where:

<interface name> is the logical name being used for the interface;

<host name> is the logical host name of the referenced <interface name>.

The ifconfig utility program ultimately results in two IOCTL commands being issued to the network processor:

nc_set_ifflags(flags=UP+<options>);

nc_set_ifaddr(ifaddr=address_of_host-name(<host name>));

The mapping of <host name> to address is typically specified in the "/etc/hosts" file. To start the NFS service, the following commands are typically then issued by the Unix start-up script:

nfsd <n> exportfs -a where:

<n> specifies number of parallel NFS server process to be started.

The nfsd utility program initiates an "nc_nfs_start" communication transaction with all network communication facilities. The "exportfs" communication transaction is used to pass the list of file systems (specified in/etc/exports) to be exported by the NFS server using the "nc_nfs_export" communication transaction.

Once the NFS service is initialized, incoming network packets address to the "NFS server UDP port" will be delivered to the NFS server of the network communications facility. It will in turn issue the necessary FS communication transactions to obtain file service. If secure authentication option is used, the NFS server will issue requests to the Authentication server daemon running on the host processor. The conventional authentication services include: mapping (ks_getcred()) a given <network name> to Unix style credential, decrypting (ks_decrypt()) a DES key using the public key associated with the <network name> and the secret key associated with user ID 0 (ie. with the <network name> of the local host).

Routing

Once a network communication facility is initialized properly, the IP layer of the network communication facility will perform the appropriate IP packet routing based on the local routing database table. This routing table is managed by the host facility using the "nc_add_route" and "nc_del_route" IOCTL commands. Once a route has been determined for a particular packet, the packet is dispatched to the appropriate network interface. If a packet is destined to the other network interface on the same network communication facility, it is processed locally. If a packet is destined to a network interface of another network communication facility, the packet is forwarded using the "nc_forward_ip_pkt()" communication transaction. If a packet is destined to a conventional network interface attached to the host facility, it is forwarded to the host facility using the "nc_forward_ip_pkt()" communication transaction.

The host facility provides the basic network front-end service for system 160. All packets that are addressed to the system 160, but are not addressed to the NFS stack UDP server port, are forwarded to the host facility's receive manager process using the following communication transactions:

nc_recv_dl_pkt (NC_PKT_IO_T,*);

where the packet type is not IP; and nc_recv_ip_pkt (NC_PKT_IO_T,*);

where the packet type is IP.

The communication transaction:

nc_recv_promis_pkt (NC_PKT_IO_T,*);

transfers packets not addressed to system 160 to the host facility when a network communication facility has been configured to receive in promiscuous mode by the host facility.

To transmit a packet, the host facility initiates a communication transaction:

nc_xmit_pkt (NC PKT_IO_T, _*);

to the appropriate network communication facility.

Finally, the host facility may monitor the messages being handled by a network communication facility by issuing the communication transaction:

nc_recv_promis_pkt (NC_PKT_IO_T,*);

to the appropriate network communication facility.

Table 7 lists the inter-facility message types supported by the FS facility.

Table 7
NC Facility Message Types

```
 5    #define  NC_ID   ( (long)( ('N'<<8) | ('C') ) << 16 )

#define  NC_IOCTL_CMD_CLASS(type)  (type & 0xfffffff0)

/* NC "mac" ioctl's */
10    #define  MAC_IOCTL_CMDS          ((1 << 4) + NC_ID)
      #define  NC_REGISTER_DL          (MAC_IOCTL_CMDS+0)
      #define  NC_SET_MACFLAGS         (MAC_IOCTL_CMDS+1)
      #define  NC_GET_MACFLAGS         (MAC_IOCTL_CMDS+2)
      #define  NC_GET_IFSTATS          (MAC_IOCTL_CMDS+3)
15
      /* BSD "if" ioctl's */
      #define  DL_IOCTL_CMDS           ((2 << 4) + NC_ID)
      #define  NC_SET_PROMSIC          (DL_IOCTL_CMDS+0)
      #define  NC_ADD_MULTI            (DL_IOCTL_CMDS+1)
20    #define  NC_DEL_MULTI            (DL_IOCTL_CMDS+2)
      #define  NC_SET_IFFLAGS          (DL_IOCTL_CMDS+3)
      #define  NC_GET_IFFALGS          (DL_IOCTL_CMDS+4)
      #define  NC_SET_IFMETRIC         (DL_IOCTL_CMDS+5)
      #define  NC_SET_IFADDR           (DL_IOCTL_CMDS+6)
25    #define  NC_GET_IFADDR           (DL_IOCTL_CMDS+7)

/* BSD "in" ioctl's */
      #define  IN_IOCTL_CMDS           ((3 << 4) + NC_ID)
      #define  NC_SET_IP_BRADDR        (IN_IOCTL_CMDS+0)
30    #define  NC_SET_IP_NETMASK       (IN_IOCTL_CMDS+1)
      #define  NC_GET_IP_BRADDR        (IN_IOCTL_CMDS+2)
      #define  NC_GET_IP_NETMASK       (IN_IOCTL_CMDS+3)

/* BSD "arp" ioctl's */
35    #define  ARP_IOCTL_CMDS          ((4 << 4) + NC_ID)
      #define  NC_ADD_ARP              (ARP_IOCTL_CMDS+0)
      #define  NC_DEL_ARP              (ARP_IOCTL_CMDS+1)
      #define  NC_GET_ARP              (ARP_IOCTL_CMDS+2)

40    /* BSD "route" ioctl's */
      #define  RT_IOCTL_CMDS           ((5 << 4) + NC_ID)
      #define  NC_ADD_ROUTE            (RT_IOCTL_CMDS+0)
      #define  NC_DEL_ROUTE            (RT_IOCTL_CMDS+1)

45    /* Host/NC to NC data communication transactions. */
      #define  NC_DLXMIT_MSGTYPES      ((6 << 4) + NC_ID)
      #define  NC_XMIT_PKT             (NC_DLXMIT_MSGTYPES+0)
      #define  NC_FWD_IP_PKT           (NC_DLXMIT_MSGTYPES+1)
```

```
       /* Data communication transactions to host receiver
       processes. */
       #define    NC_DLRECV_MSGTYPES    ((7 << 4) + NC_ID)
       #define    NC_RECV_DL_PKT        (NC_DLRECV_MSGTYPES+0)
 5     #define    NC_RECV_PROMIS_PKT    (NC_DLRECV_MSGTYPES+1)
       #define    NC_RECV_IP_PKT        (NC_DLRECV_MSGTYPES+2)

/* NFS server communication transactions */
       #define    NFS_CMDS          ((8 << 4) + NC_ID)
10     #define    NC_NFS_START      (NFS_CMDS+0)
       #define    NC_NFS_EXPORT     (NFS_CMDS+1)
       #define    NC_NFS_UNEXPORT   (NFS_CMDS+2)
       #define    NC_NFS_GETSTAT    (NFS_CMDS+3)
       #define    NC_NFS_STOP       (NFS_CMDS+4)
15     _____
```

The NC facility message structures are listed below.

```
20     /*
        * exported vfs flags.
        */
       #define EX_RDONLY    0x01    /* exported read only */
       #define EX_RDMOSTLY  0x02    /* exported read mostly
25     */ define EXMAXADDRS 10     /* max number address list */
       typedef struct {
           u_long    naddrs;    /* number of addresses */
30         vme_t     addrvec;   /* pointer to array of
                                   addresses */
       } NC_EXADDRLIST;

/*
35      * Associated with AUTH_UNIX is an array of internet
        * addresses to check root permission.
        */
       #define EXMAXROOTADDRS    10
       typedef struct {
40         NC_EXADDRLIST    rootaddrs;
       } NC_UNIXEXPORT;
```

```
/*
 * Associated with AUTH_DES is a list of network names
 * to check root permission, plus a time window to
 * check for expired credentials.
 */
#define EXMAXROOTNAMES 10
typedef struct {
      u_long nnames;
      vme_t rootnames;      /* names that point to
                               netnames */
      vme_t rootnamelens;   /* lengths */
      u_int window;
} NC_DESEXPORT;

typedef struct {
      long val[2];          /* file system id type */
} fsid_t;

/*   File identifier. Should be unique per filesystem
     on a single machine.
 */ define   MAXFIDSZ   16
struct fid {
      u_short   fid_len;    /* length of data in bytes */
      char      fid_data[MAXFIDSZ]; /* data */
};

/************************************************************
 * NFS Server Communication transaction Structures.
 ************************************************************/ typedef struct {
      K_MSGTYPE   m_type;
      int         nservers;  /* number of servers to start
                                up */
} NC_NFS_START_T;
```

```
        typedef struct {
            K_MSGTYPE   m_type;
            long        errno;          /* error returned */
            fsid_t      fsid;           /* FSID for directory being
                                           exported */
            struct fid  fid;            /* FID for directory being
                                           exported */
            long        flags;          /* flags */
            u_short     anon;           /* uid for unauthenticated
                                           requests */
            long        auth;           /* switch for authentication
                                           type */
            union {
                    NC_UNIXEXPORT exunix;       /* case AUTH_UNIX */
                    NC_DESEXPORT exdes;         /* case AUTH_DES */
            } un;
            NC_EXADDRLIST   writeaddrs;
        } NC_NFS_EXPORT_T;

typedef struct {
            K_MSGTYPE   m_type;
            long        errno;          /* error returned */
            fsid_t      fsid;           /* of directory being
                                           unexported */
            struct fid  fid;            /* FID for directory being
                                           unexported */
        } NC_NFS_UNEXPORT_T;

/*
         * Return server statistics.
         */
        typedef struct {
            int     rscalls;            /* Out - total RPC calls */
            int     rsbadcalls;         /* Out - bad RPC calls */
            int     rsnullrecv;
            int     rsbadlen;
            int     rsxdrcall;
            int     ncalls;             /* Out - total NFS calls */
            int     nbadcalls;          /* - calls that failed */
            int     reqs[32];           /* - calls for each request */
        } NC_NFS_STATS_T;
```

```
/*------------------------------------------------------------
 * Network Interface IOCTL communication transaction
   structures
 *------------------------------------------------------------*/ typedef struct {
    K_MSGTYPE   m_type;
    short       status;    /* output */
    char        unit;      /* Only used with IF, MAC and
                              IN commands. */
    char        pad;
    K_PID       receiver_pid;
    short       mem_xfer_mode;      /* 0-normal, 1-VME
                                       block, 2-AEP */
    long        recv_mem_size;      /* I */
    long        recv_mem_start_addr;/* I */
    ETHADDR     intf_addr;     /* O: address of
                                  interface */
} NC_REGISTER_DL_T;

typedef struct {
    K_MSGTYPE   m_type;
    short       status;    /* output */
    char        unit;      /* Only used with IF, MAC and
                              IN commands. */
    char  pad;
    union {
        long        promis;    /* I */
        ETHADDR     mc_addr;   /* I: add and delete */
        short       flags;     /* I: set flag; O: get
                                  flag */
        long        metric;    /* I */
        struct sockaddr if_addr; /* I */
    } un;
} NC_IFIOCTL_T;

typedef struct {
    K_MSGTYPE   m_type;
    short       status;    /* output */
    char        unit;      /* Only used with IF, MAC and
                              IN commands. */
    char        pad;
    struct if_stats {
      long if_ipackets;    /* packets received */
      long if_ibytes;      /* bytes received */
      long if_ierrors;     /* input errors */
      long if_opackets;    /* packets sent */
      long if_obytes;      /* bytes sent */
      long if_oerrors;     /* output errors */
      long if_collisions;  /* CSMA collisions */
    } if_stats;
} NC_IFSTATS_T;
```

```
typedef struct {
    K_MSGTYPE   m_type;
    short       status;     /* output */
    char        unit;       /* Only used with IF, MAC and
                               IN commands. */
    char        pad;
    union {
        struct in_addr br_addr;    /* I */
        struct in_addr net_mask;   /* I */
    } un;
} NC_INIOCTL_T;

typedef struct {
    K_MSGTYPE   m_type;
    short       status;     /* output */
    char        unit;       /* Only used with IF, MAC and
                               IN commands. */
    char        pad;
    struct arpreq  arp_req;
} NC_ARPIOCTL_T;

typedef struct {
    K_MSGTYPE   m_type;
    short       status;     /* output */
    char        unit;       /* Only used with IF, MAC and
                               IN commands. */
    char        pad;
    struct rtentry  route_req;
} NC_RTIOCTL_T;

/*----------------------------------------------------------
 * Network Interface Data Communication transaction
 Structure
 *---------------------------------------------------------*/ typedef struct {
    long        len;
    caddr_t     address;
} PKT_DATA_BUFFER;

#define     MAX_DL_BUFFRAG          4
#define     VME_XFER_MODE_NORMAL    0
#define     VME_XFER_BLOCK          1
#define     VME_XFER_AEP            2   /* enhanced
                                           protocol */
```

```
typedef struct ether_xmit {
    K_MSGTYPE  m_type;
    char  src_net;    /* Source of packet. */
    char  dst_net;    /* Destination of packet. */
    char  vme_xfer_mode; /* What transfer mode can be
                            used to access data in
                            buflist. */
    char  pad1;
    short pktlen;          /* Total packet length. */
    short pad2;
    PKT_DATA_BUFFER pkt_buflist[MAX_DL_BUFFRAG+1];
} NC_PKT_IO_T;

/*********************************************************
 * Secure Authentication Server Communication
 transactions
 *********************************************************/
/*
 * Name under which the key server registers.
 */
#define   KEYSERV_NAME    "KEYSERV"

/* Key server message types. */
#define   KS_DECRYPT     69
define   KS_GETCRED    137 typedef struct {
    K_MSGTYPE  type;
    u_long     rpcstatus;     /* RPC status */
    u_long     ksstatus;      /* key server reply
                                 status */
    vme_t      netname;       /* netname */
    long       netnamelen;    /* length of netname */
    des_block  desblock;      /* DES block in and out
*/
} KS_DECRYPT_T;

typedef struct {
    K_MSGTYPE  type;
    u_long     rpcstatus;     /* RPC status */
    u_long     ksstatus;      /* key server reply
                                 status */
    vme_t      netname;       /* netname */
    long       netnamelen;    /* length of netname */
    unixcred   cred;          /* credentials returned */
} KS_GETCRED_T;
``` c. Host Facility Communication Transactions

The communication transactions that the host facility of the present invention recognizes and provides are summarized in Table 8 below. These transactions are used to support the initialization and ongoing coordinated operation of the system 160.

TABLE 8

Host Facility Message Types

| | |
|---|---|
| sc_register_fifo | ( SC_REGISTER_FIFO_T,*** ); |
| sc_get_sys_config | ( SC_GET_SYS_CONFIG_T,***); |
| sc_register_name | ( SC_REGISTER_NAME_T,*** ); |
| sc_init_complete | ( SC_INIT_COMPLETE_T,*** ); |
| sc_resolve_name | ( SC_RESOLVE_NAME_T,*** ); |
| sc_resolve_fifo | ( SC_RESOLVE_FIFO_T,*** ); |
| sc_time_register | ( SC_TIME_REGISTER_T,*** ); |
| sc_real_time | ( SC_REAL_TIME_T,*** ); |
| sc_err_log_msg | ( SC_ERR_LOG_MSG_T,*** ); |
| sc_err_log_msg2 | ( SC_ERR_LOG_MSG2,*** ); |

Name Service

The name server daemon ("named") is the Unix host facility process that boots the system and understands all of the facility services that are present in the system. That is, each facility provides at least one service. In order for any facility to utilize a service of another, the name of that service must be published by way of registering the name with the name server daemon. A name is an ASCII string that represents a service. When the name is registered, the relevant servicing process PID is also provided. Whenever the name server daemon is thereafter queried to resolve a service name, the name server daemon will respond with the relevant process PID if the named service is available. This one level of indirection relieves the need to otherwise establish fixed process IDs for all of the possible services. Rather, the multi-tasking kernels of the messaging kernel layers are allowed to establish a PID of their own choosing to each of the named services that they may register.

The communication transaction:

sc_register_fifo (SC_REGISTER_FIFO_T, ***); is directed to the named daemon of the host facility to provide notice that the issuing NC, FS, or S facility has been started. This transaction also identifies the name of the facility, as opposed to the name of a service, of the facility that is registering, its unique facility ID (VME slot ID) and the shared memory address of its message descriptor FIFO.

The communication transaction:

sc_get_sys_config (SC_GET_SYS_CONFIG_T, ***); is used by a booting facility to obtain configuration information about the rest of the system 160 from the name server daemon. The reply message identifies all facilities that have been registered with the name server daemon.

The communication transaction:

sc_init_complete (SC_INIT_COMPLETE_T,***); is sent to the name server daemon upon completion of its initialization inclusive of handling the reply message to its sc_get_sys_config transaction. When the name server daemon returns a reply message, the facility is cleared to begin normal operation.

The communication transaction:

sc_register_name (SC_REGISTER_NAME_T,***); is used to correlate a known name for a service with the particular PID of a facility that provides the service. The names of the typical services provided in the preferred embodiment of the present invention are listed in Table 9.

TABLE 9

Named Facility Services

Host Facility Resident

SC_NAME_SERVER - the "Name server" daemon - executes on the host peer-level processor, or primary host processor if there is more than one host facility present in the system. Provides the system wide name service. Operates also to collect and distribute information as to the configuration, both physical (the total number of NCs present in the system and the VME slot number of each) and logical (what system services are available).

SC_ERRD - the "ERRD" daemon - executes on the host peer-level processor, or primary host processor if there is more than one host facility present in the system. Injects an error message into the UNIX syslogd system. This results in the error message being printed on the system console and, typically, logged it in an error file.

SC_TIMED - the "TIMED" daemon - executes on the host peer-level processor, or primary host processor if there is more than one host facility present in the system. Returns the current system time. Can also be instructed to give notification of any subsequent time changes.

SC_KEYSERV - executes on the host peer-level processor, or primary host processor if there is more than one host facility present in the system. When NFS runs in secure (DES encryption) mode, it provides access to the conventional Unix daemon that, in turn, provides access to keys which authenticate users.

FS Facility Resident

FC_VICE_PRES - executes on the FC peer-level processor, or primary FC processor if there is more than one such facility present in the system. Coordinates the operation of multiple FS facilities by servicing all requests to identify the PID of the unnamed manager process that controls access to a FSID. At least one unnamed manager process runs in each FS facility.

FC_STATMAN# - executes in a respective FC facility (#). Functions as a "statistics manager" process on the FC facility to collect and allow other facilities to request a report of current statistics, such as the number of messages received.

S Facility Resident

S_MANAGER# - executes the respective S facility (#). All low-level disk requests for the disk array coupled to the storage processor (#) are directed to this manager process. Unnamed worker processes are allocated, as necessary to actually carry out the request.

S_STATMAN# - executes in a respective S facility (#). Functions as a "statistics manager" process on the S facility to collect and allow other facilities to request a report of current statistics.

NC Facility Resident

NC_NFS_VP# - executes in a respective NC facility (#). Controls the operation of NFS for its respective NC facility. Accepts messages from the host facility for starting and stoping NFS and for controlling the export and unexport of selected file systems.

NC_DLCTRL# - executes in a respective NC

TABLE 9-continued

Named Facility Services facility (#). Functions as the Data Link controller for its NC facility (#). Accepts ioctl commands for a local message specified data link and allocates a worker process, as necessary, to carry out the message request.

NC_DLXMIT# - executes in a respective NC facility (#). Functions as the Data Link transmitter for its NC facility (#). Accepts transmit commands for a local message specified data link and allocates a worker process, as necessary, to carry out the message request.

NC_STATMAN# - executes in a respective NC facility (#). Functions as a "statistics manager" process on the NC facility to collect and allow other facilities to request a report of current statistics.

The communication transaction:

sc_resolve_name (SC_RESOLVE_NAME_T,***);

is used by the messaging kernel layer of a facility to identify the relevant process PID of a service provided by another facility. The reply message, when returned by the name server daemon, provides the "resolved" process ID or zero if the named service is not supported.

The communication transaction:

sc_resolve_fifo (SC_RESOLVE_FIFO_T,***);

is issued by a facility to the name server daemon the first time the facility needs to communicate with each of the other facilities. The reply message provided by the name server daemon identifies the shared memory address of the message descriptor FIFO that corresponds to the named service.

Time Service

The time server daemon ("timed") provides system wide timer services for all facilities.

The communication transaction:

sc_time_register (SC_TIME_REGISTER T, _***);

is issued by a facility to the timed daemon to determine the system time and to request periodic time synchronization messages. The reply message returns the current time.

The communication transaction:

sc_real_time (SC_REAL_TIME_T, ***);

is issued by the time server daemon to provide "periodic" time synchronization messages containing the current time. These transactions are directed to the requesting process, based the "client_pid" in the originally requesting message. The period of the transactions is a function of a default time period, typically on the order of several minutes, or whenever the system time is manually changed.

Error Logger Service

The error server daemon ("errd") provides a convenient service to send error messages to the system console for all facilities.

The communication transaction:

sc_err_log_msg (SC_ERR_LOG_MSG_T, ***);

prints the string that is provided in the send message, while the transaction:

sc_err_log_msg2 (SC_ERR_LOG_MSG2, ***);

provides a message and an "error id" that specifies a print format specification stored in an "errd message format" file. This format file may specify the error message format in multiple languages.

```
/***********************************************
 * Structures and Constants for the SC_NAMED process.
 ***********************************************/
/*
 * Board types.
 */
#define    BT_NONE          0
#define    BT_UNIX          1    /* Host Processor */
#define    BT_PSA           2    /* Storage Processor */
#define    BT_FC            3    /* File Controller. */
#define    BT_NC            4    /* Network Controller. */
#define    BT_PLESSEY       5    /* Test Environment */
#define    BT_TRACE_ANAL    6    /* Message Trace
                                    Analyzer. */
#define    BT_MEM           7    /* memory board. */

/*
 * Slot descriptor.
 */
typedef struct {
    short board_type;
    short slot_id;
} SLOT_DESC_T;

/******************************************
 * SC_NAMED: Types and structures.
 ******************************************/ define SC_MSG_GROUP       ( (long)( ('S'<<8) | ('C') ) << 16 )
define SC_REGISTER_FIFO   (1 | SC_MSG_GROUP )
#define SC_RESOLVE_FIFO    (2 | SC_MSG_GROUP )
#define SC_REGISTER_NAME   (3 | SC_MSG_GROUP )
#define SC_RESOLVE_NAME    (4 | SC_MSG_GROUP )
#define SC_DELAY           (5 | SC_MSG_GROUP )
#define SC_GET_SYS_CONFIG  (6 | SC_MSG_GROUP )
#define SC_INIT_COMPLETE   (7 | SC_MSG_GROUP )

#define K_MAX_NAME_LEN     32    /* Maximum process
                                    name length. */ typedef struct {
    K_MSGTYPE       type;
    short           my_slot_id;
    short           sender_slot_id;
    char            name[K_MAX_NAME_LEN];
    M16_FIFO_DESC   fifo_desc;
    short           flags;          /* flags defined below */
```

```
} SC_REGISTER_FIFO_T;

/*
 *    SC_REGISTER_FIFO_T flags:
 */
#define    NO_CM_ACCESS    1    /*    can't  access  common
memory  */ typedef struct {
     K_MSGTYPE          type;
     short              my_slot_id;
     short              dest_slot_id;
     M16_FIFO_DESC      fifo_desc;     /* 0 => not found */
} SC_RESOLVE_FIFO_T;

typedef struct {
     K_MSGTYPE          type;
     K_PID              pid;
     char               name[K_MAX_NAME_LEN];
} SC_REGISTER_NAME_T;

typedef struct {
     K_MSGTYPE          type;
     K_PID              pid;              /* 0=> not found */
     char               name[K_MAX_NAME_LEN];    /*   input
*/
} SC_RESOLVE_NAME_T;

typedef struct {
     K_MSGTYPE              type;
     SLOT_DESC_T            config[M16_MAX_VSLOTS];
} SC_GET_SYS_CONFIG_T;

typedef struct {
     K_MSGTYPE          type;
     short              my_slot_id;
} SC_INIT_COMPLETE_T;
```

```
/********************************************
 * SC_TIMED: Types and structures.
 ********************************************/ define   SC_TIMED_REGISTER    ( 101 | SC_MSG_GROUP )
define   SC_REAL_TIME         ( 102 | SC_MSG_GROUP )

typedef struct {
    K_MSGTYPE  type;
    K_PID client_pid;
    long  max_update_period;  /* in seconds. */
    /* output */
    long  seconds;            /* seconds since Jan. 1, 1970 */
    long  micro_seconds;      /* and micro seconds. */
} SC_TIMED_REGISTER_T;

typedef struct {
    K_MSGTYPE  type;
    long  seconds;            /* seconds since Jan. 1, 1970 */
    long  micro_seconds;      /* and micro seconds. */
} SC_REAL_TIME_T;

/******************************************
 * SC_ERRD: Types and Structures.
 ******************************************/

/*
 * SC_ERRD message structures.
 *
 * Error log usage notes:
 *      - Must include "syslog.h"
 *      - Priority levels are:
 *              LOG_EMERG       system is unusable
 *              LOG_ALERT       action must be taken
 *                              immediately
 *              LOG_CRIT        critical conditions
 *              LOG_ERR         error conditions
 *              LOG_WARNING     warning conditions
 *              LOG_NOTICE      normal condition
 *              LOG_INFO        informational
 *              LOG_DEBUG       debug-level messages
 */ define SC_ERR_LOG_MSG       (301 | SC_MSG_GROUP )
define SC_ERR_LOG_MSG2      (302 | SC_MSG_GROUP )

#define ERR_LOG_MSG_LEN (K_MSG_SIZE - sizeof(K_MSGTYPE)
            - sizeof(short))
```

```
         typedef struct {
            K_MSGTYPE   type;            /* SC_ERR_LOG_MSG */
            short       priority_level;
5           char        msg[ERR_LOG_MSG_LEN];   /* message   */
         } SC_ERR_LOG_MSG_T;

typedef struct {
            K_MSGTYPE   type;            /* SC_ERR_LOG_MSG */
10          short       id;                  /* Message id */
            short       fill1;               /* Unused. */
            union {
             char c[80];                 /* constants. */
             short    s[40];
15           long     l[20];
            } data;
         } SC_ERR_LOG_MSG2_T;
``` d. S Facility Communication Transactions

The communication transactions that the S facilities of the present invention recognize, and that the other messaging kernel layers of the present invention recognize as appropriate to interact with the S facility, are summarized in Table 10 below.

TABLE 10

| Summary of S Communication Transactions | |
|---|---|
| sp_noop_msg | ( SP_MSG,*** ); |
| sp_send_config | ( SEND_CONFIG_MSG,*** ); |
| sp_receive_config | ( RECEIVE_CONFIG_MSG,*** ); |
| sp_r/w_sector | ( SP_RDWR_MSG,*** ); |
| sp_r/w_cache_pg | ( SP_RDWR_MSG,*** ); |
| sp_ioctl_req | ( SP_IOCTL_MSG,*** ); |
| sp_start_stop_msp | ( SP_IOCTL_MSG,*** ); |
| sp_inquiry_msg | ( SP_MSG,*** ); |
| sp_read_message_buffer_msg | ( SP_MSG,*** ); |
| sp_set_sp_interrupt_msg | ( SP_MSG,*** ); |

The S facility generally only responds to communication transactions initiated by other facilities. However, a few communication transactions are initiated by the S facility at boot up as part of the initial system configuration process.

Each S facility message utilizes the same block message structure of the FS and NC facility messages. The first word provides a message type identifier. A second word is generally defined to return a completion status. Together, these words are defined by a SP_HEADER structure:

```
typedef {
    char reserved;              /* byte 0 */
    char msg_code;              /* byte 1 */
    char msg_modifier;          /* byte 2 */
    char memory_type;           /* byte 3 */
    char complete_status;       /* byte 4 */
    char bad_drive;             /* byte 5 */
    char sense_key;             /* byte 6 */
    char sense_code;            /* byte 7 */
} SP_HEADER;
```

The reserved byte will be used by the other facilities to identify a S facility message. Msg_code and msg_modifier specify the S facility functions to be performed. Memory_type specifies the type of VME memory where data transfer takes place. The S facility uses this byte to determine the VMEbus protocols to be used for data transfer. Memory_type is defined as:

03—Primary Memory, Enhanced Block Transfer
01—Local Shared Memory, Block transfer
00—Others, Non-block transfer The completion status word is used by the S facility to return message completion status. The status word is not written by the S facility if a message is completed without error. One should zero out the completion status of a message before sending it to the S facility. When a reply is received, one examines the completion status word to differentiate a k_reply from a k_null_reply.

The bad_drive value specifies any erroneous disk drive encountered. The higher order 4 bits specify the drive SCSI ID (hence, the drive set); the lower order 4 bits specify the S facility SCSI port number. The sense_key and sense_code are conventional SCSI error identification data from the SCSI drive.

The currently defined S facility functions, and identifying msg_code bytes are listed in Table 11.

TABLE 11

| S Facility Message Types | | |
|---|---|---|
| 01 | -- | No Op |
| 02 | -- | Send Configuration Data |
| 03 | -- | Receive Configuration Data |
| 04 | -- | S facility IFC Initialization |
| 05 | -- | Read and Write Sectors |
| 06 | -- | Read and Write Cache Pages |
| 07 | -- | IOCTL Operation |
| 08 | -- | Dump S facility Local RAM |
| 09 | -- | Start/Stop A SCSI Drive |
| 0A | -- | not used |
| 0B | -- | not used |
| 0C | -- | Inquiry |
| 0D | -- | not used |
| 0E | -- | Read Message Log Buffer |
| 0F | -- | Set S facility Interrupt |

The message completion status word (byte 4–7 of a message) is defined as:

Byte 00—completion status
01—SCSI device ID and S facility SCSI port number
0—SCSI sense key
03—SCSI sense code The completion status byte values are defined below:
00—Completed without error
01—Reserved
02—SCSI Status Error on IOCTL Message
03—Reserved
04—An inquired message is waiting to be executed
05—An inquired message is not found
06—VME data transfer error
07—Reserved
08—Invalid message parameter
09—Invalid data transfer count or VME data address
0A—S facility configuration data not available
0B—Write protect or drive fault
0C—Drive off-line
0D—Correctable data check
0E—Permanent drive error or SCSI interface error
0F—Unrecovered data check After receiving a message, the S facility copies the contents into its memory. After a message's function is completed, a k_reply or k_null_reply is used to inform the message sender. K_null_reply is used when the processing is completed without error; k_reply is used when the processing is completed with error. When k_reply is used, a non-zero completion status word is written back to the original message. Therefore, when a reply is received, a message sender checks the status word to determine how a message is completed. When k_null_reply is used, the original message is not updated. The S facility simply acknowledges the normal completion of a message.

If a message is not directed to a disk drive, it is executed immediately. Disk I/O messages are sorted and queued in disk arm elevator queues. Note, the INQUIRY message returns either 04 or 05 status and uses k_reply only.

No Op
The input parameters for this message are defined as:
sp_noop_msg (SP_MSG,***);
The only parameter needed for this message is the message header. The purpose for this message is to test the communication path between the S facility and a message sender. A k_null_reply is always used.

Send Configuration Data
The input parameters for this operation are defined as:
sp_send_config (SEND_CONFIG_MSG,***);
This message is used to inform the S facility about the operating parameters. It provides a pointer pointing to a configuration data structure. The S facility fetches the configuration data to initialize its local RAM. The configuration data is also written to a reserved sector on each SCSI disk such that they can be read back when the S facility is powered up. Hence, it is not necessary to send this message each time the S facility is powered up.

In the configuration data structure, vme_bus_request_level specifies the S facility data transfer request level on the VME bus. The access_mode specifies if the S facility should run as independent SCSI drives or as a single logical drive. In the latter case, number_of_disks should be same as number_of_banks because all nine drives in a bank are grouped into a single logical disk.

Total_sector is the disk capacity of the attached SCSI disks. Total capacity of a disk bank is this number multiplying the number_of_disks. When additional disk banks are available, they could have sizes different from the first bank. Hence, total_sector is a three_entry array. Stripe_size is meaningful only when the S facility is running as a single logical disk storage subsystem. Different stripe sizes can be used for different drive banks. Finally, online_drive_bit_-map shows the drives that were online at the last reset. Bit 5 of online_drive_bit_map[1] being set indicates drive 5 of bank 1 is online. Total_sector and online_drive_bit_map could not and should not be specified by a user.

The configuration data are written to the disks in a S facility reserved sector, which is read at every S facility reset and power up. When the configuration data are changed, one must reformat the S facility (erase the old file systems). When this message is completed, a k_reply or k_null_reply is returned.

Receive Configuration Data

The input parameters for this operation are defined as:
sp_receive_config (RECEIVE_CONFIG_MSG,***);
This message requests the S facility to return configuration data to a message sender. Vme_pointer specifies a VME memory location for storing the configuration data. The same configuration data structure specified n the last section will be returned.

Read and Write Sectors

The input parameters for this operation are defined as:
sp_r/w_sector (SP_RDWR_MSG,***);
Unlike most S facility messages, which are processed immediately, this message is first sorted and queued. Up to 200 messages can be sent to the S facility at one time. Up to thirty messages are executed on thirty SCSI drives simultaneously. The messages are sorted by their sector addresses. Hence, they are not served by the order of their arrivals.

There are two possible functions specified by this message:

$$\text{msg\_mod} = 00 -- \text{Sector Read}$$
$$= 01 -- \text{Sector Write}$$

Scsi_id specifies the drive set number. Disk_number specifies which SCSI port to be used. Sector_count specifies the number of disk sectors to be transferred. For a sector_read message, erase_sector_count specifies the number of sectors in the VME memory to be padded with zeros (each sector is 512 bytes). For a sector_write message, erase_sector_count specifies the number of sectors on the disk to be written with zeros (hence, erased). To prevent sectors from being erased inadvertently, a sector_write message can only specify one of the two counters to be non-zero, but not both. Sector_address specifies the disk sector where read or write operation starts. Vme_address specifies a starting VME memory location where data transfer takes place.

There are three drive elevator queues maintained by the S facility for each SCSI port (or one for each disk drive). The messages are inserted in the queue sorted by their sector addresses, and are executed by their orders in the queue. The S facility moves back and forth among queue entries like an elevator. This is done to minimize the disk arm movements. Separate queues for separate disk drives. These queues are processed currently because the SCSI drive disconnects from the bus whenever there is no data or command transfer activities on the bus.

If no error conditions are detected from the SCSI drive(s), this message is completed normally. When data check is found and the S facility is running as a single logical disks, recovery actions using redundant data are started automatically. When a drive is down and the S facility is running as a single logical disk, recovery actions similar to data check recovery will take place. Other drive errors will be reported by a corresponding status code value.

K_reply or K_null_reply is used to report the completion of this message.

Read/Write Cache Pages

The input parameters for this operation are defined as:
sp_r/w_cache_pg (SP_RDWR_MSG, ***);
This message is similar to Read and Write Sectors, except multiple vme_addresses are provided for transferring disk data to and from disk sectors. Each vme_address points to a memory cache page, whose size is specified by cache_page_size. When reading, data are scattered to different cache pages; when writing, data are gathered from different cache pages (hence, it is referred to as scatter_gather function).

There are two possible functions specified by this message;

$$\text{msg\_mod} = 00 -- \text{Cache Page Read}$$
$$= 01 -- \text{Cache Page Write}$$

Scsi_id, disk_number, sector_count, and sector_address are described in Read and Write Sector message. Both sector_address and sector_count must be divisible by cache_page_size. Furthermore, sector_count must be less than 160 (or 10 cache pages). Cache_page_size specifies the number of sectors for each cache page. Cache pages are read or written sequentially on the drive(s). Each page has its own VME memory address. Up to 10 vme_addresses are specified. Note, the limit of 10 is set due to the size of a S facility message. Like the sector read/write message, this message is also inserted in a drive elevator queue first.

If no error conditions are detected from the SCSI drive(s), this message is completed normally. When an error is detected, a data recover action is started. When there is a permanent drive error that prevents error recovery action from continuing, an error status code is reported as completion.

K_reply or K_null_reply is used to report the completion of this message.

IOCTL Request

The input parameters for this operation are defined as:
sp_ioctl_req (SP_IOCTL_MSG,***);
This message is used to address directly any SCSI disk or peripheral attached to a SCSI port. Multiple messages can be sent at the same time. They are served in the order of first come first serve. No firmware error recovery action is attempted by the S facility.

Scsi_id, scsi_port, and scsi_lun_address identify uniquely one attached SCSI peripheral device. Command_length and data_length specify the lengths of command and data transfers respectively. Data_buffer-_address points to a VME memory location for data transfer. The command_ bytes are actual SCSI command data to be sent to the addressed SCSI peripheral device. Note, the data length must be multiples of 4 because the S facility always transfers 4 bytes at a time. Sense_length and sense_addr specify size and address of a piece of VME memory where device sense data can be stored in case of check status is received. These messages are served by the order of their arrivals.

When this message is terminated with drive error, a corresponding status code is returned. K_reply and k_null_reply are used to report the completion of this message.

Start/Stop SCSI Drive

The input parameters for this operation are defined as: sp_start_stop_msp (SP_IOCTL_MSG,***);

This message is used to fence off any message to a specified drive. It should be sent only when there is no outstanding message on the specified drive. Once a drive is fenced off, a message directed to the drive will receive a corresponding error status back.

When the S facility is running as a single logical disk, this message is used to place a SCSI disk drive in or out of service. Once a drive is stopped, all operations to this drive will be fenced off. In such case, when the stopped drive is accessed, recovery actions are started automatically. When a drive is restarted, the data on the drive is automatically reconfigured. The reconfiguration is performed while the system is online by invoking recovery actions when the reconfigured drive is accessed.

When a drive is reconfigured, the drive configuration sector is updated to indicate that the drive is now a part of a drive set.

Message Inquiry

The input parameters for this message are defined as: sp_inquiry_msg (SP_MSG,***);

This message requests the S facility to return the status of a message that was sent earlier. A k_reply is always used. The status of the message, if available in the S facility buffers, is returned in the completion status word.

This message is used to verify if a previous message was received by the S facility. If not, the message is lost. A lost message should be resent. Message could be lost due to a local board reset. However, a message should, in general, not be lost. If messages are lost often, the S facility should be considered as broken and fenced off.

Read Message Log

The input parameters for this message are defined as: sp_read_message_buffer_msg (SP_MSG,***);

The S facility keeps a message buffer which contains the last 200 messages. Data_buffer specifies a piece of VME memory in which the messages are sent. Number_of_message should not exceed 200. Each message is 128 bytes long as defined at the beginning of this Section. An application program must allocate a buffer big enough to accommodate all returned messages.

Normally this message is sent when there is no active messages. Otherwise, it is very difficult to determine how many used messages are in the S facility message buffer. For example if there are 200 active messages, there will be no used ones in the message buffer. Where there are less than requested messages in the message buffer, 128 bytes of zeros are transmitted for each shortage. K_reply and k_null_reply are used for the completion of this message.

SP_Interrupt

The input parameters for this message are defined as: sp_set_sp_interrupt_msg (SP_MSG,***);

This message tells the S facility to pass control to an on-board debug monitor, as present in the SP boot rom. After completing this message, the S facility no longer honors any messages until the monitor returns control. A k_null_reply is always returned for this message.

The S facility message structures are listed below:

```
typedef struct psa_msg {         /* A Message Template */
    SP_HEADER      header;
    vme_t          vme_addr;
    u_long         data_length;
    u_long         sram_addr;
    u_char         msg_body[K_MSG_SIZE - 32];
    void           (*rtnadr) ( );      /* return address of
                                          a ready message */
    struct psa_msg *rblink;   /* points to a work area
                                 or msg link */
    u_long         start_time;
} SP_MSG;
typedef struct {
    char       vme_bus_request_level;
    char       access_mode;
    char       number_of_disks;
    char       number_of_banks;
    short      firmware_revision;
    short      hardware_revision;
    int        total_sector[3]
    int        stripe_size[3]
    int        online_drive_bit_map[3]
} config_data;
typedef struct {
    SP_HEADER    header;           /* byte 0-7 */
    config_data  *vme_ptr;         /* byte 8-11 */
    long         data_length;      /* byte 12-15 sizeof
                                      config_data */
} SEND_CONFIG_MSG;
typedef struct {
    SP_HEADER    header;           /* byte 0-7 */
    config_data  *vme_pointer;
    long         data_length;
} RECEIVE_CONFIG_MSG;
typedef struct {
    SP_HEADER  header;             /* byte 0-7 */
    char       scsi_id;            /* byte 8 */
    char       disk_number;        /* byte9 */
    short      reserved;           /* byte 10-11 */
    short      sector_count;       /* byte 12-13 */
    short      erase_sector_count; /* byte 14-15 */
    long       sector_address;     /* byte 16-19 */
    u_long     vme_address;        /* byte 20-23 */
} SP_RDWR_MSG;
typedef struct {
    SP_HEADER  header;             /* byte 0-7 */
    char       scsi_id;            /* byte 8 */
    char       disk_number;        /* byte 9 */
    short      reserved;           /* byte 10-11 */
    short      sector_count;       /* byte 12-13 */
    short      cache_page_size;    /* byte 14-15 */
    long       sector_address;     /* byte 16-19 */
    u_long     vme_address[10];    /* byte 20-23 */
} SP_RDWR_MSG;
typedef struct {
    SP_HEADER  header;             /* byte 0-7 */
    char       scsi_id;            /* byte 8 */
    char       scsi_port;          /* byte 9 */
    char       scsi_lun_address;   /* byte 10 */
    char       command_length;     /* byte 11 */
    u_long     data_length;        /* byte 12-15 */
    u_long     data_buffer_address; /* byte 16-19 */
    char       command_bytes[20];  /* byte 20-39 */
    u_long     sense_length;       /* byte 40-43 */
    u_long     sense_addr;         /* byte 44-47 */
} SP_IOCTL_MSG;
```

IV. Start-up Operations

A. IFC Initialization

The chart below summarizes the system operations that occur during system boot.

TABLE 12

Summary of System Initialization

Phase 1: All peer-level processors

```
{
boot to "boot-level" ready state;
}
```
Phase 2: The host boot level facility

```
{
boot Unix image through boot-level S facility;
execute Unix image;
start SC_NAME_SERVER process;
}
```
Phase 3: The host facility

```
{
for each boot-level facility {
    probe for existence;
    initialize FIFO for receiving;
    }
for each ( SP NC FC ) {
    read boot image and parameters from boot_
        level S facility;
    download boot image and boot parameters
        (including the PID of the SC_NAME_SERVER
        process) to the shared memory program
        store of the peer-level processor;
    start controller;
    }
}
```
Phase 4: Each peer-level processor

```
{
begin executing facility image
    initialize controller }
        send SC_REG_FIFO to SC_NAME_SERVER;
        send SC_GET_SYS_CONF to
        SC_NAME_SERVER;
        send SC_INIT_CMPL to
        SC_NAME_SERVER;
        }
    start manager processes {
        send SC_REG_NAMEs to
        SC_NAME_SERVER;
        send SC_RESOLVE_NAMEs to
        SC_NAME_SERVER;
        send SC_RESOLVE_FIFOs to
        SC_NAME_SERVER;
        }
}
```

The SP peer-level processors boot from onboard EPROMs. The SP boot program, in addition to providing for power-on diagnostics and initialization to a ready state, includes a complete S facility. Thus, the SP peer-level processor is able to perform SCSI disk and tape operations upon entering its ready state. In their ready states, the NC, FC, SP and H processors can be downloaded with a complete instantiation of their respective types of facilities. The downloaded program is loaded into local shared memory; for the S facility, for example, the program is loaded into its local 256K static RAM. The RAM download, particularly to static RAM, allows both faster facility execution and use of the latest release of the facility software.

After powering up or resetting the SP processor, the host facility, executing its boot program, waits for the SP boot program to post ready by indicating a ready state value in an SP status register.

Once the S boot program has posted ready, a Sector Read message from the host boot program can be used to retrieve any disk block to any VME memory location. Generally, the read request is to load the host facility from disk block 0, the boot block. In preparing a read_sector message for the S facility after power up, the local host boot program specifies the following (in addition to normal read_sector message contents):

sender_pid=0xffffffff
dest_pid=0x00000001

By specifying the above, the local host boot program signals the S facility to bypass normal IFC reply protocols and to, in turn, signal a reply complete by directly by changing the 0xffffffff message value in the original message image to any other value, such as the value of the message descriptor. That is, after building a read sector message, the host boot program writes a message descriptor to the S facility. The host boot program can then poll this sender_pid word to determine when the message is completed. Messages to the S facility are sent in this manner until the full host facility boot is complete.

Once the local host boot program has loaded the host facility and begun executing its initialization, the host facility generally switches over to normal IFC communication with the S facility. To do this, local host facility sends an IFC Initialization message to the S facility. After receiving this message, the S facility expects a shared memory block, as specified by the message, to contain the following information:

Byte 00–03—Bootlock, provides synchronization with the local host facility
Byte 04–05—S facility board slot id,
Byte 06–07—Reserved,
Byte 08–09—This board's IFC virtual slot ID
Byte 10–11—System controller process number,
Byte 12–27—System controller fifo descriptor
Byte 00–01—System controller fifo type,
Byte 02–03—System controller slot id
Byte 04–07—Fifo address
Byte 08–09—Soft fifo index,
Byte 10–11—Soft fifo index mask,
Byte 12–13—Interrupt request level,
Byte 14–15—Interrupt vector address,
Byte 28–31—Address of this common memory, and
Byte 32–35—Size of this common memory.
Byte 36–39—Hardware fifo address of the S facility The first thing the S facility does is check the bootlock variable. When it is set to a "BOOTMASTER" value, it means the local host facility is up and ready to receive messages from the S facility. Otherwise, the S facility waits for the local host facility to complete its own initialization and set the bootlock word. As soon as the bootlock word is changed, the S facility proceeds to perform IFC initialization. The following IFC messages are sent to the local host facility:

1. Register FIFO
2. Get System Configuration
3. Initialization Complete
4. Register Name
5. Resolve FIFO The second message allows the S facility to know who is in what VME slots within the system. The S facility will only register one name, "SPn" (n is either 0 or 1), with a processor ID of 1. Hence all messages directed to the S facility specify PID=SP_SLOT<<16+0x0001. Basically, a processor ID (PID) is a 4-byte word, in which the higher order two bytes contain the processor's VME slot ID. The lower order two bytes identify a process within a processor.

The register FIFO message formally informs the local host facility about the S facility's fifo address. The get system configuration message retrieves a table describing all available processors from the local host facility. After completing initialization, using the Initialization Complete message, the S facility advertises its services by issuing the Register Name message, which informs the host facility that the S facility service process is up and running. When another facility sends a message to the S facility for the first time, the S facility uses a Resolve FIFO message, directed to the host facility, to obtain the fifo address needed for a reply.

Thus, a multiple facility operating system architecture that provides for the control of an efficient, expandable multi-processor system particularly suited to servicing large volumes of network file system requests has been described.

Clearly, many modifications in variations of the present invention are possible in light of the above teachings. Therefore, it is to be understood that within the scope of the appended claims, the principles of the present invention may be realized in embodiments other than as specifically described herein.

We claim:

1. A server system architecture providing for the transfer of server data in response to client requests, said architecture comprising:

a) host processor means for executing an operating system, said operating system including a plurality of components including an operating system kernel portion, a first messaging component and first instantiations of a communications component, a filesystem component, and a storage access component;

b) communications processor means for executing a communications control program, said communications control program including a first subset of said operating system including a second messaging component and a second instantiation of said communications component;

c) filesystem processor means for executing a filesystem control program, said filesystem control program including a second subset of said operating system including a third messaging component and a second instantiation of said filesystem component; and d) storage processor means for executing a storage access control program, said storage access control program including a third subset of said operating system including a fourth messaging component and a second instantiation of said storage access component, where said first, second and third subsets of said operating system are exclusive of said operating system kernel portion and where said second, third and fourth messaging components each include means for sending and receiving messages with another of said second, third and fourth messaging components.

2. The architecture of claim 1 wherein said communications control program is responsive to a predetermined client request, wherein said second instantiation of said communications component includes means for resolving said predetermined client request into a predetermined filesystem request, said second instantiation of said communications component being coupled to said second messaging component to transfer said predetermined filesystem request, said filesystem component being coupled to said third messaging component to transfer said predetermined filesystem request, said second messaging component being coupled to said third messaging component to provide a first predetermined message identifying said predetermined filesystem request.

3. The architecture of claim 2 wherein said second instantiation of said filesystem component includes means for resolving said predetermined filesystem request into a predetermined storage access request, said storage access component being coupled to said fourth messaging component to receive said predetermined storage access request, said third messaging component being coupled to said fourth messaging component to provide a second predetermined message identifying said predetermined storage access request.

4. The architecture of claim 3 wherein said predetermined storage access request identifies predetermined data, said architecture further comprising memory means for storing data, said filesystem component providing for the allocation of a predetermined data space within said memory means for storing said predetermined data, said storage access component providing for the transfer of data with respect to said predetermined data space in response to said predetermined storage access request.

5. The architecture of claim 4 wherein said communications component provides for the transfer of data with respect to said predetermined data space in response to said predetermined filesystem request.

6. A network file server responsive to client request received via a network, said network file server comprising:

a) host processor means for executing an operating system, said operating system including an operating system kernel portion, a first messaging portion, and first instantiations of a first network communications portion and a first filesystem portion, said operating system kernel portion being coupled to said first instantiation of said first network communications portion through a first interface, to said first instantiation of said first filesystem portion through a second interface;

b) network processor means for executing a peer-level facility including a second communications portion and a second messaging portion, said second network communications portion being a second instantiation of said first network communications portion and said second messaging portion being coupled to and providing a third interface to said second network communications portion substantially equivalent to said first interface, said network communications portion, in response to a client request, generating and providing a filesystem request to said third interface, said second messaging means including means, responsive to said filesystem request, for sending a filesystem request message; and c) filesystem processor means for executing a peer-level facility including a second filesystem portion and a third messaging portion, said second filesystem portion being a second instantiation of said first filesystem portion and said third messaging portion being coupled to and providing a fourth interface to said second filesystem portion substantially equivalent to said second interface, said third messaging portion including means for receiving said filesystem request message autonomously with respect to said host means.

7. The network file server of claim 6 further comprising means, coupled to said network processor means, for storing data, said third messaging portion, in response to said filesystem request message, providing said filesystem request to said fourth interface, said filesystem portion including means for transferring data to or from said storing means in response to said filesystem request.

8. A network file server comprising:

a) storage interface means for processing data storage requests to provide for the transfer of data with respect to a rotating disk data storage medium;

b) filesystem interface means for processing filesystem requests to provide said data storage requests to said storage interface means;

c) network interface means for processing data packets transferred through a local area network to provide said filesystem requests to said filesystem interface means and to provide for the transfer of data with respect to said local area network; and d) means for coupling said storage interface means, said filesystem interface means, and said network interface means, said coupling means providing a direct data transfer path between said storage interface means and said network interface means, and said coupling means providing a direct filesystem request transfer path between said network interface means and said filesystem interface means and a direct data storage request path between said filesystem interface means and said storage interface means.

9. A network file server comprising:

a) storage interface means for processing data storage requests to provide for the transfer of data with respect to a rotating disk data storage medium;

b) filesystem interface means for processing filesystem requests to provide said data storage requests to said storage interface means;

c) network interface means for processing data packets transferred through a local area network to provide said filesystem requests to said filesystem interface means and to provide for the transfer of data with respect to said local area network; and d) means for coupling said storage interface means, said filesystem interface means, and said network interface means, said coupling means providing a direct data transfer path between said storage interface means and said network interface means, and said coupling means providing a direct filesystem request transfer path between said network interface means and said filesystem interface means and a direct data storage request path between said filesystem interface means and said storage interface means, said direct data transfer path including a data buffer coupled between said storage interface means and said network interface means through which said storage interface means and said network interface means directly exchange data transferred to and from said local area network, said direct filesystem request transfer path including a first command path coupled directly between said network interface means and said filesystem interface means to pass filesystem commands requesting the transfer of data between said storage interface means and said network interface means, said direct data storage request path including a second command path coupled directly between said filesystem interface means and said storage interface means to pass storage system commands requesting the transfer of data between said storage interface means and said network interface means.

10. A network file server system couplable to a network for the exchange of network requests including first and second network request types, the set of first and second network request types corresponding to a set of network requests that a network operating system can responsively perform, the network operating system including a plurality of facilities that conventionally participate in performing the set of network requests, said network file server system comprising:

a) storage means, including a storage facility of a network operating system, for transferring data with respect to a data storage medium in response to a storage request;

b) filesystem means, including a filesystem facility of a network operating system, for generating storage requests in response to file requests;

c) network means, including a network facility of said network operating system, for exchanging said first and second types of network requests with a network, said network facility including means for generating file requests in response to network requests of said first set of network requests, said network means providing said file requests exclusively to said filesystem means.

11. A network file server system couplable to a network for the exchange of network requests, said network file server system comprising:

a) storage means, including a storage facility of a network operating system, for transferring data with respect to a data storage medium in response to a storage request;

b) filesystem means, including a filesystem facility of said network operating system, for generating storage requests in response to file requests;

c) network means, including a network facility of said network operating system, for generating file requests in response to network requests;

d) host means, including a host facility of said network operating system, for executing an operating system, and e) communication means for coupling said storage, filesystem, network and host facilities to enable the transfer of a first set of said storage and file requests between said storage, filesystem, and network facilities and exclusive of the transfer of said first set of storage and file requests to or from said host facility, and to enable the transfer of a second set of said storage and file requests between said network, host filesystem and storage facilities.

12. A network file server system couplable to a network for the exchange of network requests, said network file server system comprising:

a) storage means, including a storage facility of a network operating system, for transferring data with respect to a data storage medium in response to a storage request;

b) filesystem means, including a filesystem facility of said network operating system, for generating storage requests in response to file requests;

c) network means, including a network facility of said network operating system, for generating file requests in response to network requests;

d) host means, including a host facility of said network operating system, for executing an operating system; and e) bus means, responsive to said storage, filesystem, network and host means, for selectively transferring said network, file and storage requests between predetermined combinations of said storage, filesystem, network and host facilities, a first selectable transfer combination including said network, filesystem and storage facilities and excluding said host facility, whereby said storage, filesystem and network facilities directly communicate with one another and selectively communicate with said host facility in response to network requests of a predetermined type.

13. A network file server system couplable to a network for the exchange of network requests, said network file server system comprising:

a) storage means, including a storage facility of a network operating system, for transferring data with respect to a data storage medium in response to a storage request;

b) filesystem means, including a filesystem facility of said network operating system, for generating storage requests in response to file requests;

c) network means, including a network facility of said network operating system, for generating file requests in response to network requests;

d) host means, including a host facility of said network operating system, for executing an operating system, and e) a transfer path coupling said storage, filesystem and network means, said transfer path providing for the transfer of storage requests, file requests and data among said storage, filesystem and network facilities to enable said storage, filesystem and network means to operate autonomously relative to said host facility in responding to network requests.

14. A method for performing a network file server function through a partial operating system including a network facility coupled to a local area network, a filesystem facility and a storage facility coupled to a data storage disk, and request and data transfer paths intercoupling said network, filesystem and storage facilities, said method comprising the steps of:

a) receiving a network filesystem request from said local area network by said network facility;

b) communicating said network filesystem request directly to said filesystem facility via a first request transfer path;

c) processing said network filesystem request by said filesystem facility to communicate a data storage request directly to said storage facility via a second request transfer path;

d) processing said data storage request by said storage facility to retrieve data from said data storage disk and to directly transfer said data to said network facility via a data transfer path; and e) transferring said data received by said network facility to said local area network.

15. A method for performing a network file server function through a partial operating system including a network facility coupled to a local area network, a filesystem facility and a storage facility coupled to a data storage disk, and request and data transfer paths intercoupling said network, filesystem and storage facilities, said method comprising the steps of:

a) receiving a network filesystem request and data from said local area network by said network facility;

b) communicating said network filesystem request directly to said filesystem facility via a first request transfer path;

c) processing said network filesystem request by said filesystem facility to communicate a data storage request directly to said storage facility via a second request transfer path;

d) transferring said data received by said network facility directly to said storage facility via a data transfer path; and e) processing said data storage request by said storage facility to receive and transfer said data to said data storage disk.

16. The method of claim 14 or 15 wherein the direct transfers of said requests and said data are characterized as being performed in the absence of a step of transferring said requests and said data through a host facility.

17. The method of claim 14 wherein the direct transfer of said data from said storage facility to said network facility comprises the steps of:

a) transferring said data to a memory buffer by said storage facility; and b) transferring said data from said memory buffer by said network facility.

18. The method of claim 15 wherein the direct transfer of said data from said network facility to said storage facility comprises the steps of:

a) transferring said data to a memory buffer by said network facility; and b) transferring said data from said memory buffer by said storage facility.

19. The method of claim 14, 15, 17 or 18 wherein the step of processing said network filesystem request by said filesystem facility excludes a step of processing said network filesystem request through a virtual filesystem.

\* \* \* \* \*

UNITED STATES PATENT AND TRADEMARK OFFICE
CERTIFICATE OF CORRECTION

PATENT NO. : 5,485,579
DATED : January 16, 1996
INVENTOR(S) : Hitz, et al.

It is certified that error appears in the above-indentified patent and that said Letters Patent is hereby corrected as shown below:

Col. 6, line 2, after "invention", please insert --shown--;

Col. 8, line 33, after "The messaging", please delete "kernel" and insert therefor --kernel's";

Col. 15, line 25, after "such as", please delete "the";

Col. 22, line 49, after "18'", please insert --,--;

Col. 25, line 35, please delete "non-NF$" and insert therefor --non-NFS--;

Col. 26, line 32, after "178,", please delete "at $t_9$";

Col. 36, line 15, after "modified", please insert --to--;

Col. 53, line 13, please delete "sc_regiser name" and insert therefor --sc_register_name--;

Col. 66, line 22, please delete "0-SCSI sense key" and insert therefor --02-SCSI sense key"--;

Col. 8, line 53, please delete "a"; and

Col. 67, line39, after "specified", please delete "n" and insert therefor --in--.

Signed and Sealed this

Twentieth Day of August, 1996

Attest:

BRUCE LEHMAN

Attesting Officer

Commissioner of Patents and Trademarks